United States Patent
Schneider et al.

(10) Patent No.: US 12,435,239 B2
(45) Date of Patent: Oct. 7, 2025

(54) COATING COMPOSITIONS AND METHODS INCLUDING CARBODIIMIDES

(71) Applicant: PPG Industries Ohio, Inc., Cleveland, OH (US)

(72) Inventors: John Schneider, Allison Park, PA (US); Martin Neal, Mars, PA (US); Hilary Ann Kerchner, Gibsonia, PA (US); Johnathan Michael Roppo, Pittsburgh, PA (US); Hongying Zhou, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 215 days.

(21) Appl. No.: 18/546,451

(22) PCT Filed: Feb. 17, 2022

(86) PCT No.: PCT/US2022/016740
§ 371 (c)(1),
(2) Date: Aug. 15, 2023

(87) PCT Pub. No.: WO2022/178091
PCT Pub. Date: Aug. 25, 2022

(65) Prior Publication Data
US 2024/0158663 A1    May 16, 2024

Related U.S. Application Data

(60) Provisional application No. 63/150,792, filed on Feb. 18, 2021.

(51) Int. Cl.
C09D 175/08    (2006.01)
C08G 18/09     (2006.01)
(Continued)

(52) U.S. Cl.
CPC ......... C09D 175/08 (2013.01); C08G 18/095 (2013.01); C08G 18/246 (2013.01);
(Continued)

(58) Field of Classification Search
CPC   C08G 18/289; C08G 18/718; C08G 18/5024; C08G 18/797; C08G 59/4042; C08G 77/42
See application file for complete search history.

(56) References Cited

U.S. PATENT DOCUMENTS 4,118,536 A    10/1978  Beardsley et al.
6,063,890 A *   5/2000  Tye ............... C09D 163/00
                                                528/65
(Continued)

FOREIGN PATENT DOCUMENTS

CN    101560655 A    10/2009
EP     0507407 A1    10/1992
(Continued)

OTHER PUBLICATIONS

Machine translation KR2009-0110256 (Year: 2025).*
(Continued)

Primary Examiner — Alexandre F Ferre

(57) ABSTRACT

Coated substrates and methods may comprise a multi-unit carbodiimide. The multi-unit carbodiimide may also be combined with a siloxane. The multi-unit carbodiimide and/or the siloxane may be used in a surface coating applied to a substrate, and an overcoat may be applied to the surface coating. The surface coating may chemically interact with the overcoat and/or the substrate to improve corrosion resistance and other properties of the coated substrate.

20 Claims, 4 Drawing Sheets

(51) Int. Cl.
 *C08G 18/24* (2006.01)
 *C08G 18/28* (2006.01)
 *C08G 18/48* (2006.01)
 *C08G 18/75* (2006.01)
 *C08G 18/81* (2006.01)
 *C09D 5/00* (2006.01)
 *C09D 5/03* (2006.01)
 *C09D 5/08* (2006.01)

(52) U.S. Cl.
 CPC ....... *C08G 18/289* (2013.01); *C08G 18/4833* (2013.01); *C08G 18/758* (2013.01); *C08G 18/8108* (2013.01); *C09D 5/002* (2013.01); *C09D 5/03* (2013.01); *C09D 5/08* (2013.01)

(56) References Cited

U.S. PATENT DOCUMENTS

| | | | |
|---|---|---|---|
| 10,100,069 | B2 | 10/2018 | Burckhardt et al. |
| 2009/0056873 | A1 | 3/2009 | Schumacher et al. |
| 2011/0206936 | A1* | 8/2011 | Maliverney .......... B01J 31/0251 524/588 |
| 2012/0041545 | A1* | 2/2012 | Wyman ................. A61L 31/022 604/528 |
| 2016/0024310 | A1 | 1/2016 | McMullin et al. |
| 2017/0129987 | A1 | 5/2017 | Burckhardt et al. |
| 2019/0202973 | A1 | 7/2019 | Laas |
| 2020/0026969 | A1 | 1/2020 | Oliver et al. |
| 2021/0139624 | A1* | 5/2021 | Lindquist .......... C08F 222/1025 |

FOREIGN PATENT DOCUMENTS

| | | |
|---|---|---|
| EP | 0969029 A1 | 1/2000 |
| KR | 20090110256 A | 10/2009 |
| WO | 2007020762 A2 | 2/2007 |
| WO | 2015158862 A1 | 10/2015 |
| WO | WO2020/046937 A1 | 3/2020 |

OTHER PUBLICATIONS

International Search Report and Written Opinion received for PCT Application Serial No. PCT/US2022/016740 dated May 16, 2022, 10 pages.

* cited by examiner

COATING COMPOSITIONS AND METHODS INCLUDING CARBODIIMIDES

CROSS-REFERENCE TO RELATED APPLICATION

This application claims priority to U.S. Provisional Application No. 63/150,792, filed Feb. 18, 2021, which is herein incorporated by reference in its entirety.

FIELD

The present disclosure relates to coating compositions including carbodiimides and/or siloxane-modified carbodiimides, methods for forming the carbodiimides and/or siloxane-modified carbodiimides, as well as methods for forming coating compositions including carbodiimides and/or siloxane-modified carbodiimides.

BACKGROUND

Coatings are applied to substrates in order to provide numerous properties including protective and decorative properties. Typically, these coatings are applied across the entire surface of the substrates including edges and corners. However, the compositions that form these coatings often flow over the edges and corners resulting in low film build around these areas. Furthermore, some coatings do not have adequate adhesion to substrates. As a result, the coatings pull away from edges, corners, and scratched areas of the substrates, so the properties provided by the coatings are not obtained or are diminished in these locations.

What is needed is an improvement over the foregoing.

SUMMARY

The present disclosure provides coating compositions and methods including multi-unit carbodiimides. The multi-unit carbodiimides may be modified by siloxane compounds and may be used as a surface coating on a substrate, to which an overcoat may be applied. The overcoat may include an acid functional or hydroxyl group that may chemically interact with the surface coating. The carbodiimide and siloxane surface coatings may improve overcoat uniformity, corrosion resistance, and overall adhesion of the overcoat to the substrate.

The present disclosure provides a method for improving adhesion of a coating to a substrate and/or for improving edge coverage and corrosion resistance of a coating on a substrate, including contacting at least a portion of the substrate with a surface coating comprising a multi-unit carbodiimide of the formula:

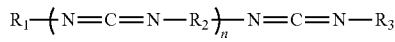

wherein: $R_1$ and $R_3$ each independently comprise a group selected from alkyl, arylalkyl, cycloalkyl, ether, polyether, siloxane, urethane, urea, imine, amide, carbodiimide, isocyanate, carbonyl, and carbamate; $R_2$ comprises a group selected from alkyl, arylalkyl, and cycloalkyl; and n is at least 2; applying, to the surface coating, an overcoat comprising group reactive with the surface coating; and curing the overcoat to form a coating layer.

The present disclosure also provides a coated substrate including a substrate; and a coating applied to the substrate, the coating comprising: a surface coating applied to at least a portion of the substrate, the surface coating comprising a multi-unit carbodiimide having the formula:

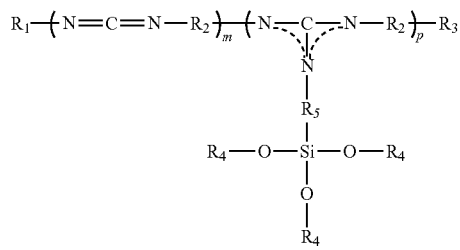

wherein: $R_1$ and $R_3$ independently comprise a group selected from alkyl, arylalkyl, cycloalkyl, ether, polyether, siloxane, urethane, urea, imine, amide, carbodiimide, isocyanate, carbonyl, and carbamate; $R_2$ comprises a group selected from alkyl, arylalkyl, and cycloalkyl; $R_4$ comprises a group selected from alkyl, arylalkyl, cycloalkyl, amine, and siloxane; R5 comprises a comprises a group selected from alkyl, arylalkyl, cycloalkyl, amine, and amide; m+p is at least 2; and the dashed lines represent tautomerization wherein any one of the carbon-nitrogen bonds is a double bond; and an overcoat layer disposed on the surface coating and chemically bonded to the surface coating through an acid functionalized or hydroxyl group of the overcoat layer.

The present disclosure further provides a compound including a multi-unit carbodiimide of the following formula:

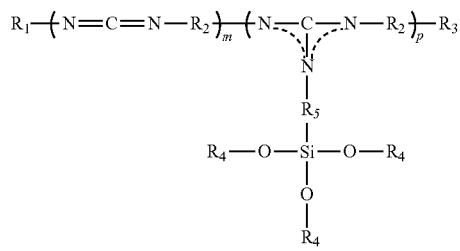

wherein: $R_1$ and $R_3$ independently comprise a group selected from alkyl, arylalkyl, cycloalkyl, ether, polyether, siloxane, urethane, urea, imine, amide, carbodiimide, isocyanate, carbonyl, and carbamate; $R_2$ comprises a group selected from alkyl, arylalkyl, and cycloalkyl; $R_4$ comprises a group selected from alkyl, arylalkyl, cycloalkyl, amine, and siloxane; $R_5$ comprises a group selected from alkyl, arylalkyl, cycloalkyl, amine, and amide; m+p is at least 2; and the dashed lines represent tautomerization wherein any one of the carbon-nitrogen bonds is a double bond.

The present disclosure further provides a method of making a siloxane-modified multi-unit carbodiimide compound including reacting a carbodiimide with a siloxane, the carbodiimide having the following formula:

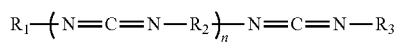

wherein: $R_1$ and $R_3$ independently comprise a group selected from alkyl, arylalkyl, cycloalkyl, ether, polyether, siloxane, urethane, urea, imine, amide, carbodiimide, isocyanate, carbonyl, and carbamate; $R_2$ comprises a group selected from alkyl, arylalkyl, and cycloalkyl; and n is at least 2; and the siloxane having the following formula:

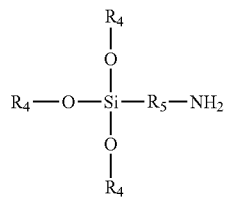

wherein: $R_4$ comprises a group selected from alkyl, arylalkyl, cycloalkyl, amine, and siloxane; and $R_5$ comprises a group selected from alkyl, arylalkyl, cycloalkyl, amine, and amide; and wherein the reacting step forms a siloxane-modified multi-unit carbodiimide compound of the following formula:

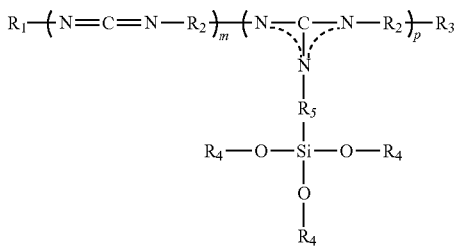

wherein m+p is at least 2 and the dashed lines represent tautomerization wherein any one of the carbon-nitrogen bonds is a double bond.

DETAILED DESCRIPTION

Figure 1:
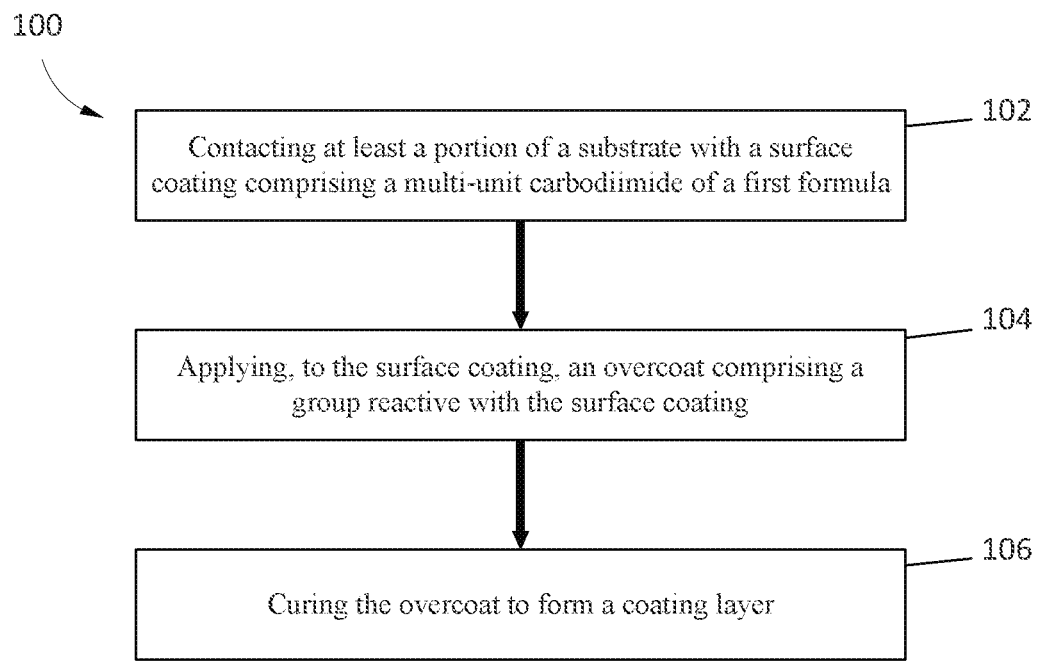
FIG. 1 is a diagram showing a method for coating a substrate.

The present disclosure provides coating compositions and methods including multi-unit carbodiimides. The multi-unit carbodiimides may be modified by siloxane compounds and may be used as a surface coating on a substrate, to which an overcoat may be applied. The overcoat may include an acid functional or hydroxyl group that may chemically interact with the surface coating. The carbodiimide and siloxane surface coatings may improve overcoat uniformity, corrosion resistance, and overall adhesion of the overcoat to the substrate.

I. Definitions

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." For example, numerical ranges provided for coating thicknesses, weight percentages of components, or amounts of components added should be construed as being modified by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The use of the singular includes the plural and plural encompasses singular, unless specifically stated otherwise. In addition, the use of "or" means "and/or" unless specifically stated otherwise, even though "and/or" may be explicitly used in certain instances.

"Poly" refers to 2 or more. For example, in the present disclosure, a polycarbodiimide comprises 2 or more carbodiimide groups.

"Polymer" refers to oligomers, homopolymers (e.g., prepared form a single monomer species), copolymers (e.g., prepared form at least two monomer species), terpolymers (e.g., prepared from at least three monomer species), and graft polymers.

"Reactive functional group" refers to a chemical group capable of chemically reacting with another reactive functional group to form a covalent bond.

"Isocyanate" refers to an —N=C=O group.

"Amine" refers to an —$NR_2$ group, wherein each R is independently selected from hydrogen and an organic group. An amine may comprise a primary amine group, a secondary amine group, a tertiary amine group, or a combination of any of the foregoing.

"Siloxane" refers to an —$Si(OR)_x$ group, wherein each R is independently selected from hydrogen, silicon, and an organic group, and x may be 1, 2, or 3. A siloxane may be part of a larger, polysiloxane structure comprising at least two silicon atoms covalently bonded through an oxygen atom.

"Carbodiimide" refers to a —C=N=C— group.

"Interfacial flow" refers to the flow of an overcoat at an interface of a surface coating and the overcoat.

"Cure" and "curable", as used in connection with an overcoat, refer to at least a portion of the components that make up the overcoat are polymerizable and/or crosslinkable, including self-crosslinkable polymers.

"Acid-functionalized" refers to a group comprising an acid (Lewis, Arrhenius, Bronsted-Lowry, etc.) or any group with a relatively acidic hydrogen.

"Hydroxyl" refers to an —OH group.

II. Substrates

As previously described, the present disclosure relates to contacting at least a portion of a substrate with a surface coating, applying an overcoat to the surface coating, and curing the overcoat to form a coating layer.

The substrate according to the present disclosure can be selected from a wide variety of substrates and combinations thereof. Non-limiting examples of substrates include vehicles and automotive substrates, industrial substrates, marine substrates and components such as ships, vessels, and on-shore and off-shore installations, storage tanks, packaging substrates, aerospace components, wood flooring and furniture, fasteners, coiled metals, heat exchangers, vents, an extrusion, roofing, wheels, grates, belts, conveyors, grain or seed silos, wire mesh, bolts or nuts, a screen or grid, HVAC equipment, frames, tanks cords, wires, apparel, electronic components, including housings and circuit boards, glass, sports equipment, including golf balls, stadiums, buildings, bridges, containers such as a food and beverage containers, and the like. As used herein, "vehicle" or variations thereof includes, but is not limited to, civilian, commercial and military aircraft, and/or land vehicles such as airplanes, helicopters, cars, motorcycles, and/or trucks. The shape of the substrate can be in the form of a sheet, plate, bar, rod or any shape desired.

The substrates, including any of the substrates previously described, can be metallic or non-metallic. Metallic substrates include, but are not limited to, tin, steel, cold rolled steel, hot rolled steel, steel coated with zinc metal, zinc compounds, zinc alloys, electrogalvanized steel, hot-dipped galvanized steel, galvanealed steel, galvalume, steel plated with zinc alloy, stainless steel, zinc-aluminum magnesium alloy coated steel, zinc-aluminum alloys, aluminum, aluminum alloys, aluminum plated steel, aluminum alloy plated steel, steel coated with a zinc-aluminum alloy, magnesium, magnesium alloys, nickel, nickel plating, bronze, tinplate, clad, titanium, brass, copper, silver, gold, 3-D printed metals, cast or forged metals and alloys, or combinations thereof.

Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, engineering polymers such as poly(etheretherketone) (PEEK), polycarbonate acrylobutadiene styrene (PC/ABS), polyamide, wood, veneer, wood composite, particle board, medium density fiberboard, cement, stone, glass, paper, cardboard, textiles, leather both synthetic and natural, composite substrates such as fiberglass composites or carbon fiber composites, 3-D printed polymers and composites, and the like.

III. Surface Coating

The substrate of the present disclosure is configured to be at least partially coated with a surface coating. The surface coating may be configured to improve adhesion of the overcoat with the substrate. Additionally, the surface coating may be applied to the substrate before the application of the overcoat and any optional subsequent coating layers. The surface coating may also be referred to as a "first material" as well as a "primer" or a "priming coating".

The surface coating may be selected to interact with the overcoat and/or the substrate. As used herein, the term "interact" and variants thereof refer to the ability of the surface coating to effect or influence any aspect of the overcoat and/or substrate including, for example, its cure, physical/chemical properties, performance, appearance, and the like, and also encompasses chemical bonding. The surface coating may comprise a catalyst that catalyzes the curing of the overcoat, a component that is reactive with at least one component of the overcoat, and/or a rheology modifier that affects the flow of the overcoat over the substrate.

As used herein, a "catalyst" refers to a material that increases the rate of reaction of one or more reactive components. Thus, the surface coating may comprise a catalyst that increases the rate of reaction of the film-forming resin(s) and optional crosslinker(s) that form a binder to thereby catalyze cure of the overcoat. The catalyst used as all or part of the surface coating may therefore be selected based on the components used in the overcoat.

The surface coating may comprise a component that is reactive with at least one component of the overcoat. For example, the surface coating may comprise a component that is reactive with a film-forming resin(s) and/or crosslinker(s) used in the overcoat and/or a binder in the overcoat. Non-limiting examples of such reactive components include a crosslinker, a resin such as a film-forming resin, a reactive diluent, a monomer, or any combination thereof.

It is appreciated that the functionality and types of crosslinkers, resins, reactive diluents, and monomers used in the surface coating are selected to react with the functionality of one or more components of the overcoat. For example, as discussed further below, the overcoat may comprise a hydroxyl functional film-forming resin and the surface coating may comprise a crosslinker reactive with the hydroxyl functionality such as, for example, an oxazoline functional crosslinker, a polycarbodiimide functional crosslinker, an isocyanate or blocked isocyanate functional crosslinker, an aminoplast crosslinker, or any combination thereof. Other non-limiting examples include overcoats that comprise a carboxylic acid functional film-forming resin and surface coating that comprise an epoxy crosslinker, a beta-hydroxyalkylamide crosslinker, a hydroxyalkylurea crosslinker, and/or glycoluril.

The surface coating may comprise a multi-unit carbodiimide of the following formula (I):

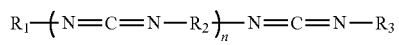

wherein $R_1$ and $R_3$ each independently comprise a group selected from alkyl, arylalkyl, cycloalkyl, ether, polyether, siloxane, urethane, urea, imine, amide, carbodiimide, isocyanate, carbonyl, and carbamate; $R_2$ comprises a group selected from alkyl, arylalkyl, and cycloalkyl; and n is at least 2, at least 4, at least 5, at least 10, at least 15, or any range including any two of these values as endpoints. The surface coating may comprise a backbone with carbodiimide and $R_2$ groups and terminating/end groups with $R_1$ and $R_3$ groups.

$R_1$ and $R_3$ may independently comprise a polyether group of the following formula (IV):

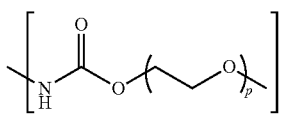

wherein p is at least 6; a methylstyrene group of the following formula (V):

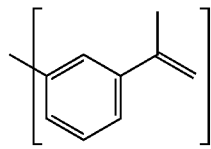

and/or a siloxane group of the following formula (VI):

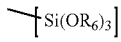

wherein $R_6$ comprises a group selected from hydrogen, methyl, ethyl, and isopropyl.

Additionally, $R_2$ may comprise a dicyclohexylmethane group of the following formula (VII):

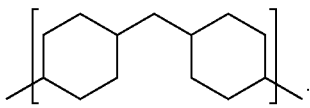

The backbone of the surface coating may comprise diclyhexylmethane groups and carbodiimide groups, and the terminating groups of the surface coating may comprise polyether, methylstyrene, siloxane, silane, isocyanate, cyclohexane, amide, carbamate, urea, and any combination thereof. The multi-unit carbodiimide that may be used within the surface coating may be formed by reacting two compounds with isocyanate groups. For example, a backbone compound, such as a monomer with two or more isocyanate groups, may react to form the backbone of the carbodiimide wherein the isocyanate groups react with isocyanate groups on other monomers to form a polycarbodiimide. The polycarbodiimide may form a chain, or a branched or networked structure. A terminating group with an isocyanate group may react with the backbone structure to terminate the multi-unit carbodiimide. As a specific example, methylene-bis-(4-cyclohexyldiisocyanate), such as that found in Desmodur W from Bayer Material Science LLC, may react with 3-Isopropenyl-α,α-dimethylbenzyl isocyanate, such as that found in M-TMI from Allnex, to form a multi-unit carbodiimide. The multi-unit carbodiimide may then be further reacted with methoxy polyethylene glycol, polyurethane, and/or siloxane to alter the terminating groups of the multi-unit carbodiimide.

The surface coating may be formed through the reaction process described above and carried out in an organic solution. The resulting carbodiimide may be water soluble/dispersible and may be dissolved or suspended in water before being applied to the substrate. The formation of the carbodiimide may be implemented at ambient pressures and within a temperature range of 0° C. to 200° C. The reaction may be run until most of the isocyanate groups have reacted, as indicated by IR spectroscopy. The reaction process to form a multi-unit carbodiimide may result in a mixture of carbodiimides of varying lengths and end groups.

Additionally, the surface coating may comprise a siloxane of the following formula (II):

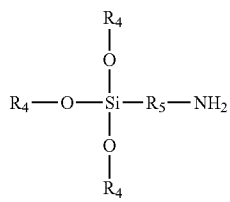

wherein: $R_4$ comprises a group selected from alkyl, arylalkyl, cycloalkyl, amine, and siloxane; and $R_5$ comprises a group selected from alkyl, arylalkyl, cycloalkyl, amine, and amide. The siloxane may be part of a polysiloxane group, wherein the silicon atoms are bound together through oxygen atoms forming a polysiloxane network or a polysiloxane chain. An example of a suitable siloxane may be found in Hydrosil products available from Evonik Industries. The siloxane may comprise an amine group configured to react with a carbodiimide.

The surface coating may also comprise a compound formed from the reaction of the multi-unit carbodiimide of formula (I) with the siloxane of formula (II) to form a product of the formula (III):

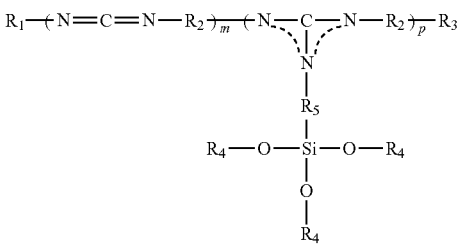

wherein $R_1$-$R_5$ comprise groups as outlined above, the dashed lines represent tautomerization wherein any one of the carbon-nitrogen bonds is a double bond, and m+p is at least 2, at least 4, at least 5, at least 10, at least 15, or any range including any two of these values as endpoints, and m and n individually may be zero, the same number, or different numbers. Additionally, the repeating groups (m) and (p) may alternate or be present in any combination, since the siloxane may bond to any carbodiimide in the carbodiimide structure and may not necessarily all bond to carbodiimides on one side of the compound. For example, a compound according to formula (III) may comprise an (m) group, followed by an (p) group, followed by an (m) group, followed by an (p) group. The representation of (m) and (p) as separate repeating groups is intended to show that not every carbodiimide within the multi-unit carbodiimide may bond to a siloxane group. The number of carbodiimides within a multi-unit carbodiimide that may bond to siloxane groups may be affected by the ratio of carbodiimide to siloxane or other reaction conditions.

Any of the compounds disclosed herein may also be present in a tautomeric form. For example, the compound according to formula (III) may tautomerize within the (p) group, wherein the C=N double bond may be present between the carbon and any of the three nitrogen atoms. Even when not shown in a formula, hydrogen atoms may be present when necessary in the molecule. Furthermore, any isomers of any disclosed compounds may also be used in place of or in addition to the illustrated formulas.

The compound of formula (III) may be formed by the reaction of the amine group of the siloxane with a carbodiimide of the multi-unit carbodiimide. The compound of formula (III) may also be referred to as a multi-unit carbodiimide and/or a siloxane, since it comprises both a multi-unit carbodiimide group and a siloxane group. The siloxane group may comprise multiple amine groups to react with multiple carbodiimide groups, either within the same multi-unit carbodiimide structure, or within separate multi-unit carbodiimide structures. Additionally, one multi-unit carbodiimide structure may react with multiple siloxanes. In forming a compound of the formula (III), the ratio of carbodiimide to siloxane may be altered to change different properties of the final compound, such as the number of siloxane groups coupled to the carbodiimide. The mole ratio of carbodiimide to siloxane may be 1:1, 1:1.5, 0.5:1.5, 0.5:3, 1.5:1, 2:1, 2.5:1, 2.5:1.5, 3:0.5, or another suitable ratio. Alternatively stated, for one mole of carbodiimide, the siloxane may be present in 0.1 moles, 0.2 moles, 0.3 moles, 0.4 moles, 0.5 moles, 0.6 moles, 0.7 moles, 0.8 moles, 0.9 moles, 1 mole, 1.5 moles, 2 moles, 2.5 moles, 3 moles, 5 moles, or any range including any two of these values as endpoints. Alternatively stated, for one mole of siloxane, the carbodiimide may be present in 0.1 moles, 0.2 moles, 0.3 moles, 0.4 moles, 0.5 moles, 0.6 moles, 0.7 moles, 0.8 moles, 0.9 moles, 1 mole, 1.5 moles, 2 moles, 2.5 moles, 3 moles, or any range including any two of these values as endpoints. While the multi-unit carbodiimide and siloxane compound of formula (III) shows the siloxane reacting with a terminal carbodiimide, the siloxane may react with any carbodiimide in the multi-unit carbodiimide structure.

The reaction between a carbodiimide and siloxane to form an example of a surface coating may be carried out at mild conditions, such as at room temperature and ambient pressure, and may be carried out through mixing in an aqueous or organic solvent. The reaction between the siloxane and the carbodiimide may happen relatively quickly and may occur in the presence of a substrate such that the reaction product of the siloxane and the carbodiimide forms directly on the substrate. The surface coating on the substrate may comprise a multi-unit carbodiimide, a siloxane, the reaction product of a carbodiimide and a siloxane, and combinations thereof.

The surface coating may interact with the substrate to which it is applied, such as via chemical bonding. For example, a siloxane group, such as those shown in formulas (II) and (III) may interact with a metal substrate comprising-OH groups on the substrate surface. The siloxane may form bonds to the substrate through the —OH groups. Surface coatings comprising a carbodiimide may also bond to the substrate without a siloxane of formula (II). For example, a carbodiimide may comprise a siloxane, such as a siloxane with formula (VI), and the siloxane may aid in bonding the carbodiimide to the substrate. Additionally, the surface coating may form intermolecular, covalent, and/or ionic bonds with the substrate to increase the adhesion of the surface coating to the substrate.

While certain chemical groups have been described as having particular formulas for illustrative purposes, the group may be present in any generic form. For example, $R_1$ and $R_3$ may comprise any polyether group and is not limited to the specific polyether group illustrated in formula (IV).

The surface coating, which may comprise a catalyst, reactive component, and/or rheology modifier, may be in solid or liquid form. The surface coating may also be dispersed or dissolved in an aqueous or non-aqueous liquid medium. The dispersions and solutions may comprise additional components including, but not limited to, surfactants and surfactant solubilizers. It is further appreciated that the overcoat may also include a catalyst, reactive component such as a crosslinker, and/or rheology modifier that is different than the catalyst, reactive component, and/or rheology modifier of the surface coating.

As used herein, a "non-aqueous medium" refers to a liquid medium comprising less than 50 weight % water, based on the total weight of the liquid medium. Such non-aqueous liquid mediums may comprise less than 40 weight % water, or less than 30 weight % water, or less than 20 weight % water, or less than 10 weight % water, or less than 5% water, based on the total weight of the liquid medium. The solvents that make up 50 weight % or more of the liquid medium include organic solvents. Non-limiting examples of suitable organic solvents include polar organic solvents e.g., protic organic solvents such as glycols, glycol ether alcohols, alcohols; and ketones, glycol diethers, esters, and diesters. Other non-limiting examples of organic solvents include aromatic and aliphatic hydrocarbons.

IV. Overcoat

The overcoat may comprise a powder overcoat which, as used herein, refers to an overcoat embodied in solid particulate form. The overcoat may also comprise a liquid overcoat, which may be formed by melting or otherwise liquidizing a powder overcoat.

The overcoat of the present disclosure is configured to interact with at least the surface coating. The overcoat may bond to the surface coating through intermolecular forces (Van der Waals, dipole-dipole, hydrogen, etc.), covalent bonds, and/or ionic bonds to improve adhesion of the overcoat to the surface coating and/or the substrate. For example, the overcoat may comprise acid functionalized, hydroxyl, amine, and/or thiol groups that may react with surface coating (e.g., a carbodiimide). The overcoat may comprise a carboxylic acid that may react with at least one of the reactive groups in the surface coating, such as a carbodiimide group. The overcoat may directly bond to the substrate itself or may be indirectly bonded to the substrate through the surface coating. The overcoat may also comprise a siloxane and/or a silane group such that the overcoat may also interact directly with the substrate.

The surface coating of the present disclosure may be selected to interact with the desired overcoat. The overcoat may be a curable powder and/or liquid overcoat that comprises a binder. The curable overcoat may be cured with heat, increased or reduced pressure, chemically such as with moisture, or with other means such as actinic radiation, and combinations thereof. The term "actinic radiation" refers to electromagnetic radiation that can initiate chemical reactions. Actinic radiation includes, but is not limited to, visible light, ultraviolet (UV) light, infrared (IR), X-ray, and gamma radiation.

Further, a "binder" refers to a constituent material that may hold all overcoat components together upon curing. The binder may comprise one or more film-forming resins that may be used to form the coating layer. As used herein, a "film-forming resin" refers to a resin that may form a self-supporting continuous film on at least a horizontal surface of a substrate upon removal or any diluents or carriers present in the composition and/or upon curing. The term "resin" is used here interchangeably with "polymer".

The overcoat used with the present disclosure may include any variety of thermosetting powder compositions as known in the art. As used herein, the term "thermosetting" refers to compositions that "set" irreversibly upon curing or crosslinking, wherein polymer chains of polymeric components are joined together by covalent bonds. This property is usually associated with a cross-linking reaction of the composition constituents often induced, for example, by heat or radiation. Once cured, a thermosetting resin will not melt upon the application of heat and is insoluble in solvents. The overcoats used with the present disclosure may also include thermoplastic powder compositions. As used herein, "thermoplastic" refers to compositions that include polymeric components that are not joined by covalent bonds and, thereby, can undergo liquid flow upon heating.

Non-limiting examples of suitable film-forming resins that form at least a portion of the binder of the overcoat include (meth)acrylate resins, polyurethanes, polyesters, polyamides, polyethers, polysiloxanes, epoxy resins, vinyl resins, copolymers thereof, and combinations thereof. As used herein, "(meth)acrylate" and like terms refers both to the acrylate and the corresponding methacrylate. Further, the film-forming resins may have any of a variety of functional groups including, but not limited to, carboxylic acid groups, amine groups, epoxide groups, hydroxyl groups, thiol groups, carbamate groups, amide groups, urea groups, isocyanate groups (including blocked isocyanate groups), and combinations thereof.

Thermosetting overcoats typically comprise a crosslinker that may be selected from any of the crosslinkers known in the art to react with the functionality of one or more film-forming resins used in the overcoat. As used herein, the term "crosslinker" refers to a molecule comprising two or more functional groups that are reactive with other functional groups and that is capable of linking two or more monomers or polymers through chemical bonds. Alternatively, the film-forming resins that form the binder of the overcoat may have functional groups that are reactive with themselves; in this manner, such resins are self-crosslinking.

Non-limiting examples of crosslinkers include phenolic resins, amino resins, epoxy resins, triglycidyl isocyanurate, beta-hydroxy (alkyl) amides, alkylated carbamates, (meth) acrylates, isocyanates, blocked isocyanates, polyacids, anhydrides, organometallic acid-functional materials, polyamines, polyamides, aminoplasts, carbodiimides, oxazolines, and combinations thereof.

The overcoat may also be substantially free, essentially free, or completely free of any of the previously described film-forming resins and/or crosslinkers. For example, the overcoat may be substantially free, essentially free, or completely free of a hydroxyl functional film-forming resin and/or an isocyanate functional crosslinker. The term "substantially free" as used in this context means the overcoat contains less than 1000 parts per million (ppm), "essentially free" means less than 100 ppm, and "completely free" means less than 20 parts per billion (ppb) of a certain film-forming resin and/or crosslinker such as a hydroxyl functional film forming resin and/or an isocyanate functional crosslinker, based on the total weight of the overcoat.

The overcoat may also include other optional materials. For example, the overcoat may also comprise a colorant. As used herein, "colorant" refers to any substance that imparts color and/or other opacity and/or other visual effect to the composition. The colorant may be added to the coating in any suitable form, such as discrete particles, dispersions, solutions, and/or flakes. A single colorant or a mixture of two or more colorants may be used in the coatings of the present disclosure.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant may be organic or inorganic and may be agglomerated or non-agglomerated. Colorants may be incorporated into the coatings for example by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment".

Example dyes include, but are not limited to, those that are solvent and/or aqueous based such as phthalo green or blue, iron oxide, bismuth vanadate, anthraquinone, and peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of components that may be used with the overcoat of the present disclosure include plasticizers, abrasion resistant particles, fillers including, but not limited to, micas, talc, clays, and inorganic minerals, metal oxides, metal flake, various forms of carbon, antioxidants, hindered amine light stabilizers, UV light absorbers and stabilizers, surfactants, flow and surface control agents, thixotropic agents, catalysts, reaction inhibitors, corrosion-inhibitors, and other customary auxiliaries.

After being applied over the substrate to which the surface coating is applied, the overcoat may be physisorbed onto the substrate. As used herein, "physisorbed", "physisorption", and like terms refers to a physical adsorption of a composition or material over the substrate in which the forces involved are intermolecular forces. Alternatively, the overcoat may be chemisorbed onto the substrate. As used herein, "chemisorbed", "chemisorption", and like terms refers to a chemical adsorption of a composition or material over the substrate in which chemical or ionic bonds are formed.

The present overcoat may be a topcoat, i.e., an exteriormost or exteriorly exposed coating, which either may be applied directly to the outer surface of the substrate article or alternatively, may be applied over one or more underlying coatings, or undercoats. For example, one undercoat may be a surface coating, which is applied directly to the outer surface of the substrate article, with the present overcoat applied over the surface coating. The present overcoat may also form part of a coating system which includes a primer together with a midcoat applied over the surface coating, with the present overcoat applied over the midcoat. Further, the surface coating layer may include one or more distinct, separately applied layers, and the midcoat may also include one or more distinct, separately-applied layers.

V. Coating Methods

Figure 2:
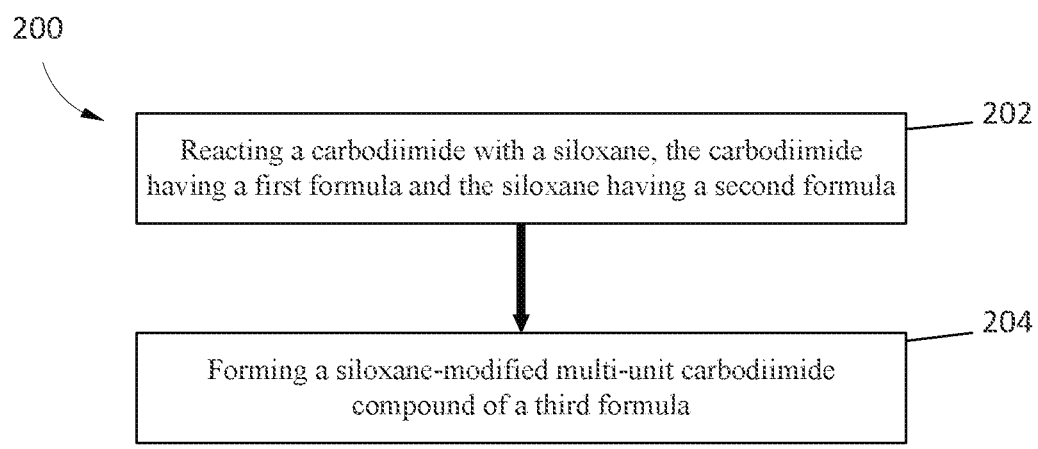
FIG. 2 is a diagram showing a method for forming a carbodiimide compound.

As shown in FIG. 1, a method 100 for coating a substrate is shown. The method includes contacting 102 at least a portion of a substrate with a surface coating comprising a multi-unit carbodiimide of a first formula, applying 104 to the surface coating, an overcoat comprising a group reactive with the surface coating, and curing 106 the overcoat to form a coating layer. As shown in FIG. 2, a method 200 for forming a surface coating to apply to a substrate is shown. Method 200 includes reacting 202 a carbodiimide with a siloxane, the carbodiimide having a first formula and the siloxane having a second formula and forming 204 a siloxane-modified multi-unit carbodiimide compound of a third formula. The first formula may be formula (I), the second formula may be formula (II), and the third formula may be formula (III) as described above.

The surface coating may be applied directly to the substrate without any intermediate layers between the surface coating and the substrate. For instance, the surface coating may be applied directly to a metal substrate, before or after the substrate is cleaned and/or treated as further described herein, but before application of any coating layers. The surface coating may also be applied during cleaning such as a component of the cleaner. The surface coating may be applied over the entire surface, edges, and corners of the substrate, or the surface coating may be applied over selected portions of the substrate. For example, the surface coating may be selectively applied over the edges and corners of the substrate so that the later applied overcoat only interacts with the surface coating over the edges and corners of the substrate. The surface coating may also form a continuous or semi-continuous layer over the substrate, or the surface coating may be applied over certain spots/areas of the substrate such as the edges and corners of the substrate. As used herein, the area referred to as the "edge" will vary based on the particular substrate but may include, e.g., the outer most lateral face of the substrate.

Once applied, the surface coating may be physisorbed onto the substrate in which the surface coating is physically adsorbed over the substrate through intermolecular forces. Alternatively, the surface coating is chemisorbed onto the substrate in which the surface coating is chemically adsorbed over the substrate through valence forces or chemical bonding. For example, the surface coating may bond to the substrate through hydroxyl groups present on the substrate.

The surface coating may also be incorporated into a pretreatment composition that is applied over the substrate. As used herein, a "pretreatment composition" refers to a composition that reacts with and chemically alters the substrate surface achieving at least one of the following: 1) formation of a protective layer; 2) improved substrate topography or reactivity to enhance coating adhesion; or 3) formation of a protective layer with improved coating adhesion in comparison to the substrate without pretreatment. Non-limiting examples of pretreatment compositions include compositions that comprise iron phosphate, manganese phosphate, zinc phosphate, a rare earth metal, permanganate or manganese, molybdate or molybdenum, zirconium, titanium, hafnium, lanthanides, a silane such as an alkoxysilane, hydrolyzed silanes and silane oligomers and polymers, metal chelates, trivalent chrome (TCP), silicate, silica, phosphonic acids, chromate conversion coating, hydrotalcite, layered double hydroxide, metal oxides, other metals such as Group IV metals, or any combination thereof. Non-limiting examples of organic pretreatments may include chemically modified resins such as phosphatized epoxies, silanized epoxies and amino functional resins. The pretreatment may also include anodizing using, such as for example, sulfuric acid, nitric acid, hydrofluoric acid, tartaric acid, and other anodizing methods. The pretreatment composition may be in the form of a sol-gel, a liquid, or a solid. In some instances, a pretreatment may contain or be sealed using an oligomeric or polymeric solution or suspension. In yet other instances, a pretreatment composition may contain small organic molecules with reactive functionality or those which function as corrosion inhibitors.

When the pretreatment composition is applied to the substrate and cured or dried, a surface region of the pretreatment layer applied to the substrate may have a greater concentration of the surface coating than a bulk region of the layer applied to the substrate. For example, the surface tension of the surface coating may be lower than the surface tension of other components of the pretreatment composition. As a result, the surface coating migrates to the surface of the pretreatment layer (i.e., moves through the bulk region to the surface region) such that a greater concentration of the surface coating may be found in the surface region, while the remaining amount of the surface coating is dispersed throughout the bulk region.

As used herein, the "surface region" means the region that is generally parallel to the exposed air-surface of the coated substrate, and which has thickness generally extending perpendicularly from the surface of the cured coating beneath the exposed surface. A "bulk region" of the cured composition means the region which extends beneath the surface region, and which is generally parallel to the surface of the coated substrate.

The pretreatment composition that includes the surface coating may comprise greater than 0.05 weight %, greater than 0.1 weight %, greater than 1 weight %, less than 20 weight %, less than 15 weight %, less than 10 weight %, less than 8 weight %, less than 5 weight %, less than 3 weight % of the surface coating, or within any range including any two of these amounts as end points, based on the total weight of the pretreatment composition or may comprise any range using any two of the foregoing values as endpoints.

The surface coating can also be applied over at least a portion of a substrate that has already had a previous pretreatment and/or coating applied. For example, the surface coating can be applied to a previously deposited pretreatment layer. Non-limiting examples of pretreatment layers include layers formed from any of the previously described pretreatment compositions. The surface coating can also be applied over a primer layer or another previously applied coating layer.

The surface coating may be applied in the absence of binder components that react to form a coating layer when cured such as through crosslinking. That is, the surface coating may be applied to the substrate or a previously applied coating as a non-film forming composition that does not form a separate coating layer. Thus, the surface coating may not be contained in a overcoat that can be cured to form a coating layer which is separate from the coating layer formed from the overcoat applied directly over the substrate to which the surface coating has been applied. If one or more binder components are present, the dry film thickness of any potential resulting film may be less than 2.5 microns, less than 2 microns, less than 1.5 microns, less than 1 micron, or less than 0.5 micron. For example, the surface coating can be applied such that any other optional components are substantially free, essentially free, or completely free of binder components that react to form a separate coating layer from the coating layer when cured. The term "substantially free" as used in this context means the optional components applied with the surface coating contain less than 1000 parts per million (ppm), "essentially free" means less than 100 ppm, and "completely free" means less than 20 parts per billion (ppb) of binder components that react to form a separate coating layer from the coating layer when cured, based on the total weight of all the components.

One method for applying the surface coating to the substrate comprises dipping the substrate into a solution that contains the surface coating. The solution can be, for example, a pretreatment bath. As used herein, a "pretreatment bath" refers to a liquid bath containing the surface coating and that may optionally contain other components typically found in any type of pretreatment bath. Non-limiting examples of pretreatment baths that the surface coating can be incorporated into include a cleaner bath, a deoxidizer bath, a cleaner coater bath, a rinse conditioner bath, a pretreatment coating bath, a rinsing bath, a sealing bath, or a deionized water rinsing bath. It will be appreciated that the surface coating can be added to any commercially available pretreatment product. It will also be appreciated that when spray pretreatments are used, immersion steps may be avoided entirely.

A "cleaner bath" is a bath comprising materials for removing grease, dirt, or other extraneous matter from the substrate. Non-limiting examples of materials for cleaning the substrate include mild or strong alkaline cleaners.

A "deoxidizer bath" is a bath comprising materials for removing an oxide layer found on the surface of the substrate such as acid-based deoxidizers. Non-limiting examples of acid-based deoxidizers include phosphoric acid, citric acid, nitric acid, fluoroboric acid, sulfuric acid, chromic acid, hydrofluoric acid, and ammonium bifluoride.

A "cleaner-coater bath" is a bath comprising materials for both cleaning and coating the substrate in the same stage. The cleaner-coater bath can therefore clean the substrate, for example as with a mild or strong alkaline cleaner, and then coat the substrate, for example with a pretreatment coating as previously described, in a single step. A nonlimiting example of a cleaner-coater includes CHEMFOS 51HD, commercially available from PPG.

A "rinse conditioner bath" is a bath comprising activating agents for increasing the number of activation sites on the surface of the substrate for improved reaction with a pretreatment composition in order to enhance the protection of the substrate. A non-limiting example of a rinse conditioner bath is a bath comprising activating agents that increase the number of sites on the surface of the substrate where phosphate crystals form upon application of a phosphate coating.

A "pretreatment coating bath" refers to a bath comprising a composition for forming a protective layer over the surface of the substrate. Non-limiting examples of pretreatment compositions include any of the pretreatment compositions previously described.

A "rinsing bath" is a bath comprising a solution of rinsing agents to remove any residue after application of a cleaner or pretreatment layer such as a phosphate containing pretreatment layer. In some non-limiting examples, a rinsing bath may simply contain city water or de-ionized water.

A "sealing bath" is a bath comprising a solution or dispersion that is capable of affecting a material deposited onto a substrate in such a way as to enhance its physical and/or chemical properties. Sealer compositions generally utilize solubilized metal ions and/or other inorganic materials to enhance the protection (e.g., corrosion protection) of pretreated substrates. Non-limiting examples include CHEMS EAL 59 and CHEMS EAL 100, both which are commercially available from PPG.

A "deionized water rinsing bath" is a bath that comprises deionized water and can be utilized in multiple stages of a pretreatment process such as a final rinsing stage before drying.

Other non-limiting examples of application methods that can be used to apply the surface coating onto the substrate include: spraying, such as by incorporating the surface coating into a liquid formulation and using spray equipment; wiping where the surface coating is contained on and/or in a wipe and manually or automatically wiped; media blasting where the surface coating is a solid and is blasted onto the substrate's surface; electrostatically applied as a powder; brushing or rolling the surface coating over the substrate such as by incorporating the surface coating into a formulation (e.g., liquid or gel) that can be brushed or rolled; vapor deposition; electrodeposition where the formulation is liquid and is electro-coated; or any combination thereof. The surface coating may also be applied in-mold, during extrusion, during a calendaring, or during other processing of substrate materials.

The previously described methods of applying the surface coating can also be used in the absence of binder components. For example, the previously described baths can be substantially free, essentially free, or completely free of binder components that react to form a separate coating layer from the coating layer when cured. The term "substantially free" as used in this context means that the methods such as the baths use or contain less than 1000 parts per million (ppm), "essentially free" means less than 100 ppm, and "completely free" means less than 20 parts per billion (ppb) of binder components that react to form a separate coating layer from the coating layer when cured, based on the total weight of the components such as the components that form the baths.

The surface coating can be deposited onto the substrate by one or more of any of the previously described methods. The surface coating can also be applied alone or in combination with other treatments or coating processes. For example, the substrate of the present disclosure can be dipped or submerged into one or more of any of the previously described baths that include the surface coating during treatment of the substrate. For instance, the surface coating can be incorporated into: a cleaner bath to apply the surface coating directly over the surface substrate; a pretreatment coating bath to apply the surface coating over the substrate together with the pretreatment layer; or a final deionized water rinse to apply the surface coating over a pretreatment layer. In another non-limiting example, the substrate is sprayed or wiped with a solution that comprises the surface coating after application of a pretreatment layer or primer layer. In another non-limiting example, the surface coating may be present in more than one process step.

The substrate can undergo various treatments prior to application of the surface coating. For instance, the substrate can be alkaline cleaned, deoxidized, mechanically cleaned, ultrasonically cleaned, solvent wiped, roughened, plasma cleaned or etched, exposed to chemical vapor deposition, treated with an adhesion promoter, plated, anodized, annealed, cladded, or any combination thereof prior to application of the surface coating. The substrate can be treated using any of the previously described methods prior to application of the surface coating such as by dipping the substrate in a cleaner and/or deoxidizer bath prior to applying the surface coating. The substrate can also be plated prior to applying the surface coating. As used herein, "plating" refers to depositing a metal over a surface of the substrate. The substrate may also be 3D printed.

As indicated, the overcoat is directly applied to at least a portion of the substrate to which the surface coating is applied. That is, the overcoat is directly applied to at least a portion of the substrate to which the surface coating has been applied, such that the surface coating and the overcoat are in contact with each other without any intermediate coating layers in between. The overcoat can be applied to the substrate to which the surface coating is applied without any intervening steps such as drying or heating steps. Alternatively, an additional process step(s) can be conducted before applying the overcoat including, but not limited to, drying by air and/or heating the surface coating. For example, the surface coating can be applied in a final deionized water rinse or in a pretreatment composition and then dried by air or heat before applying the overcoat. The surface coating can also be applied to the substrate followed by a rinsing step.

After application of the overcoat, the surface coating can be localized at the interface or point of contact between the surface coating and the liquidized overcoat. That is, the surface coating can be in contact with the liquidized overcoat but does not migrate into the liquidized overcoat. Alternatively, at least a portion of the surface coating can migrate into at least a portion of the liquidized overcoat. For instance, the surface coating can migrate into a portion of the bulk region of the liquidized overcoat.

The overcoat can be applied to the substrate to which the surface coating is applied to form a monocoat. As used herein, a "monocoat" refers to a single coating layer that is free of additional coating layers. Thus, the overcoat can be applied directly to a substrate and cured to form a single layer coating, i.e., a monocoat.

The coated substrate of the present disclosure may further comprise one or more additional coating layers, such as a second overcoat deposited onto at least a portion of the first overcoat, to form a multi-layer coating such as by applying a topcoat. When a multi-layer coating is formed, the first overcoat can be cured prior to application of additional overcoat s, or one or more of the additional overcoat and the first overcoat can be cured simultaneously. It is appreciated that the second overcoat and/or additional overcoat can be in solid or liquid form.

The overall coating on the substrate may have a thickness of greater than 20 µm, greater than 30 µm, greater than 40 µm, less than 250 µm, less than 200 µm, less than 150 µm, or any range including any two of these amounts as endpoints. For example, the overall coating may have a thickness of 20 µm-250 µm, 30 µm-200 µm, or 40 µm-150 µm. The thickness may be measured using an Elcometer film gauge (model number SSSBC127-X) and averaged between three measurements.

IV. Coated Substrate Properties

Substrates coated according to the present disclosure may have one or more improved properties and/or may address one or more issues known in the coating industry. This may include, for example: improved coating edge coverage; improved corrosion resistance; more uniform coverage across the entire surface of a substrate including the edges and/or corners; improved sealing over the entire surface of a substrate including the edges and/or corners; increased sag resistance; improved adhesion; and/or improved chip resistance such as resistance during shipping and storing of the coated substrate. As used herein, "sag" refers to as the undesirable flow of the coating on vertical or near-vertical surfaces that produce films of unequal thickness. "Sag resistance" therefore refers to the resistance of the coating to flow on vertical or near-vertical surfaces.

With the application of the surface coating to the substrate as described herein, it may be observed that corrosion resistance for the coated substrate is greater than that of a substrate without application of the surface coating, where corrosion resistance is measured through total scribe creep according to ATSM B117 as described in the Examples herein. For example, corrosion resistance may improve by at least 1%, at least 5%, at least 10%, at least 20%, at least 30%, at least 40%, at least 50%, at least 60%, at least 70%, at least 80%, or within any range including any two of these amounts as endpoints. Described another way, the total scribe creep for coated substrates with a surface coating may be less than 9 mm, less than 8 mm, less than 7 mm, less than 6 mm, less than 5 mm, less than 4 mm, less than 3 mm, less than 2 mm, or any range including any two of these amounts as endpoints after testing under ATSM B117 for 750 hours.

Substrates with a surface coating as disclosed may exhibit increased edge coverage of the overcoat and/or overall coating as measured through scanning electron microscope (SEM) analysis when compared to substrates without a surface coating. For an example, using an Aspex SEM under high vacuum with an accelerating voltage of 20 kV, coated substrates as disclosed may have a film buildup covering a sharp edge of a substrate of at least 2 µm, at least 3 µm, at least 4 µm, at least 5 µm, at least 6 µm, at least 7 µm, at least 8 µm, at least 9 µm, or within any range including any two of these values as endpoints. Stated differently, a substrate with a surface coating and an overcoat may improve edge coverage over a substrate without a surface coating by at least 1%, at least 5%, at least 10%, at least 20%, at least 30%, at least 40%, at least 50%, at least 60%, at least 70%, at least 80%, or within any range including any two of these amounts as endpoints.

Substrates with a surface coating as disclosed may exhibit increased edge corrosion resistance. For example, coated substrates as disclosed may only have a percentage of their edges exhibit corrosion. Coated substrates may demonstrate less than 100% edge corrosion, less than 50% edge corrosion, less than 30% edge corrosion, less than 20% edge corrosion, less than 15% edge corrosion, less than 10% edge corrosion, less than 5% edge corrosion, or within any range including any two of these values as endpoints.

Additionally, when the surface coating comprises a multi-unit carbodiimide and a siloxane as described herein, it may be observed that the coated substrate demonstrates improved corrosion resistance compared to coated substrates that only use one of the multi-unit carbodiimide and the siloxane, wherein corrosion resistance is measured through total scribe creep according to ATSM B117 as described in the Examples herein.

EXAMPLES

Embodiments provided by the present disclosure are further illustrated by reference to the following examples, which describe methods of making multilayer systems and properties of the multilayer systems. It will be apparent to those skilled in the art that many modifications, both to materials, and methods, may be practiced without departing from the scope of the disclosure.

Experimental Methods

Isocyanate (NCO) Titrations

Isocyanate titrations were run using a Metrohm 888 Titrando: titration by dissolving a sample (~2 grams) of the mixture in 30 mL of a solution comprised of 20 ml of dibutylamine and 980 ml of n-methyl pyrrolidone, followed by titration with 0.2 N HCl solution in isopropanol titration agent)

Number Average Molecular Weight Determination

Mn as used herein, refers to the number average molecular weight and means the theoretical value as determined by Gel Permeation Chromatography using Waters 2695 separation module with a Waters 410 differential refractometer (RI detector) and polystyrene standards. The Mn values reported according to the disclosure were determined using this method. Tetrahydrofuran (THF) was used as the eluent at a flow rate of 1 ml min-1, and two PL Gel Mixed C columns were used for separation.

Example 1

Carbodiimide Resin A Formation

In this example, a carbodiimide resin is formed, referred to below as Carbodiimide A. Carbodiimide A is used in later examples to test corrosion resistance on substrates. The components used to form Carbodiimide A are shown in Table 1 below.

TABLE 1

Carbodiimide A Composition

| Ingredients | Parts by weight |
|---|---|
| Charge #1 | |
| Desmodur W[1] | 787.0 |
| M-TMI[2] | 241.5 |
| Dowanol PM Acetate [3] | 69.0 |
| Phospholene oxide[4] | 5.1 |
| Charge #2 | |
| Dibutyltin dilaurate[5] | 0.09 |
| Charge #3 | |
| Carbowax MPEG 550 [6] | 193.8 |
| Dowanol PM Acetate[3] | 20.6 |
| Charge #4 | |
| Above resin | 600 |
| Charge #5 | |
| Deionized water | 720 |
| Rhodafac RS-610-A25 | 84.5 |

[1]Desmodur W is methylene-bis-(4-cyclohexyldiisocyanate) from Bayer Material Science, LLC
[2]M-TMI is 3-Isopropenyl-α,α-dimethylbenzyl isocyanate from Allnex.
[3] Dowanol PM Acetate is methyl ether propylene glycol acetate and commercially available from Dow Chemical.
[4]Phospholene oxide is 1-methyl-1-oxo-phospholene from Clariant Chemical
[5]Dibutyltin dilaurate is commercially available from Air Products & Chemicals
[6] Carbowax 550 is methoxy polyethylene glycol, 550 MW from Dow chemical Co.
[7] Rhodafac RS-610-A25 is commercially available from Solvay.

Charge 1 was added to a 2-liter, 4-necked flask equipped with a motor driven stainless steel stir blade, a water-cooled condenser, a nitrogen sparge, and a heating mantle with a thermometer connected through a temperature feedback control device. The contents of flask were heated to 160° C. and held at that temperature until the isocyanate equivalent weight (NCO EQ Wt) measured >2600 eq/g by titration. The temperature was then decreased to 90° C. and NCO Eq Wt was measured again 2631. At 90° C., charge 2 was added into reaction mixture, then charge 3 was added over 20 minutes. The mixture was held at 90-100° C. until IR spectroscopy showed the absence of the characteristic NCO band. Water dispersible carbodiimide resin was obtained.

To another 2 L flask, charge 5 was added and the mixture was preheated to 80° C. Then, charge 4 (water dispersible carbodiimide) was added into 2 L flask and the mixture was maintained by stirring over 20 minutes. The formed waterborne resin was cooled to 40° C. and poured out.

Example 2

Carbodiimide Resin B Formation

In this example, a carbodiimide resin is formed, referred to below as Carbodiimide B. Carbodiimide B is used in later examples to test corrosion resistance on substrates. The components used to form Carbodiimide B are shown in Table 2 below.

TABLE 2

Carbodiimide B Composition

| Ingredients | Parts by weight |
|---|---|
| Charge #1 | |
| Desmodur W[1] | 393.5 |
| M-TMI[2] | 120.8 |
| PROGLYDE ™ DMM[3] | 30.2 |
| Phospholene oxide[4] | 2.60 |
| Charge #2 | |
| Dibutyltin dilaurate[5] | 0.045 |
| Charge #3 | |
| Carbowax MPEG 550 [6] | 56.9 |
| Silquest A-1110[7] | 7.2 |
| PROGLYDE ™ DMM | 17.3 |
| Charge #4 | |
| Above resin | 488.0 |
| Charge #5 | |
| Deionized water | 1463.9 |
| Rhodapex AB-20 | 124.5 |

[1]Desmodur W is methylene-bis-(4-cyclohexyldiisocyanate) from Bayer Material Science, LLC
[2]M-TMI is 3-Isopropenyl-α,α-dimethylbenzyl isocyanate from Allnex.
[3]PROGLYDE ™ DMM is dipropylene glycol dimethyl ether is commercially available from Dow Chemical
[4]Phospholene oxide is 1-methyl-1-oxo-phospholene from Clariant Chemical
[5]Dibutyltin dilaurate is commercially available from Air Products & Chemicals
[6] Carbowax 550 is methoxy polyethylene glycol, 550 MW from Dow chemical Co.
[7]Silquest A-1110 is commercially available from Momentive Performance Materials.
[8] Rhodapex AB-20 is surfactant and commercially available from SOLVAY.

Charge 1 was added to a 3-liter, 4-necked flask equipped with a motor driven stainless steel stir blade, a water-cooled condenser, a nitrogen sparge, and a heating mantle with a thermometer connected through a temperature feedback control device. The contents of flask were heated to 160° C. and held at that temperature until the isocyanate equivalent weight (NCO EQ Wt) measured >2600 eq/g by titration. The temperature was then decreased to 100° C. and NCO Eq Wt was measured again 2827. At 100° C., charge 2 was added into reaction mixture, then Charge 3 was added over 20 minutes. The mixture was held at 90-100° C. until IR spectroscopy showed the absence of the characteristic NCO band. Water dispersible carbodiimide resin was obtained.

To another 1 L flask, charge 5 was added and the mixture was preheated to 80° C. Then, charge 4 (water dispersible carbodiimide resin) was added into 1 L flask and the mixture was maintained by stirring over 20 minutes. The formed waterborne resin was cooled to 40° C. and poured out.

Example 3

Carbodiimide Resin C Formation

In this example, a carbodiimide resin is formed, referred to below as Carbodiimide C. Carbodiimide C is used in later examples to test corrosion resistance on substrates. The components used to form Carbodiimide C are found in Table 3 below.

TABLE 3

| Carbodiimide C Composition | |
|---|---|
| Ingredients | Parts by weight |
| Charge #1 | |
| Desmodur W[1] | 262.3 |
| M-TMI[2] | 67.1 |
| PROGLYDE ™ DMM[3] | 16.8 |
| Phospholene oxide[4] | 1.6 |
| Charge #2 | |
| Dibutyltin dilaurate[5] | 0.03 |
| Charge #3 | |
| Carbowax MPEG 550 [6] | 56.5 |
| PROGLYDE ™ DMM[3] | 16.8 |
| Charge #4 | |
| Above resin | 200 |
| Charge #5 | |
| Deionized water | 300 |
| Hitenol BC-1025[7] | 31 |

[1]Desmodur W is methylene-bis-(4-cyclohexyldiisocyanate) from Bayer Material Science, LLC
[2]M-TMI is 3-Isopropenyl-α,α-dimethylbenzyl isocyanate from Allnex.
[3]PROGLYDE ™ DMM³is is dipropylene glycol dimethyl ether and commercially available from Dow Chemical.
[4]Phospholene oxide is 1-methyl-1-oxo-phospholene from Clariant Chemical
[5]Dibutyltin dilaurate is commercially available from Air Products & Chemicals
[6] Carbowax 550 is methoxy polyethylene glycol, 550 MW from Dow chemical Co.
[7]Hitenol BC-1025 is commercially available from Dai ichi Kogyo Seiyaku.

Charge 1 was added to a 2-liter, 4-necked flask equipped with a motor driven stainless steel stir blade, a water-cooled condenser, a nitrogen sparge, and a heating mantle with a thermometer connected through a temperature feedback control device. The contents of flask were heated to 160° C. and held at that temperature until the isocyanate equivalent weight (NCO EQ Wt) measured >2600 eq/g by titration. The temperature was then decreased to 90° C. and NCO Eq Wt was measured again 2631. At 90° C., charge 2 was added into reaction mixture, then charge 3 was added over 20 minutes. The mixture was held at 90-100° C. until IR spectroscopy showed the absence of the characteristic NCO band. Water dispersible carbodiimide resin was obtained.

To another 2 L flask, charge 5 was added and the mixture was preheated to 80° C. Then, charge 4 (water dispersible carbodiimide) was added into 2 L flask and the mixture was maintained by stirring over 20 minutes. The formed waterborne resin was cooled to 40° C. and poured out.

Example 4

Carbodiimide Resin D Formation

In this example, a carbodiimide resin is formed, referred to below as Carbodiimide D. Carbodiimide D is used in later examples to test corrosion resistance on substrates in Example Q. The components used to form Carbodiimide D are shown below in Table 4.

TABLE 4

| Carbodiimide D Composition | |
|---|---|
| Ingredients | Parts by weight |
| Charge #1 | |
| Desmodur W[1] | 1192.3 |
| M-TMI[2] | 304.9 |
| PROGLYDE ™ DMM[3] | 30.2 |
| Phospholene oxide[4] | 7.5 |
| Charge #2 | |
| Dibutyltin dilaurate[5] | 0.13 |
| Charge #3 | |
| Carbowax MPEG 550 [6] | 243.6 |
| PROGLYDE ™ DMM[3] | 43.6 |
| Charge #4 | |
| Above resin | 1518.5 |
| Charge #5 | |
| Deionized water | 2086.6 |
| Sodium dodecylbenzenesulfonate | 36.1 |

[1]Desmodur W is methylene-bis-(4-cyclohexyldiisocyanate) from Bayer Material Science, LLC
[2]M-TMI is 3-Isopropenyl-α,α-dimethylbenzyl isocyanate from Allnex.
[3]PROGLYDE ™ DMM is dipropylene glycol dimethyl ether is commercially available from Dow Chemical.
[4]Phospholene oxide is 1-methyl-1-oxo-phospholene from Clariant Chemical
[5]Dibutyltin dilaurate is commercially available from Air Products & Chemicals
[6] Carbowax 550 is methoxy polyethylene glycol, 550 MW from Dow chemical Co.
[7] Sodium dodecylbenzenesulfonate is commercially available from Sigma Aldrich Charge 1 was added to a 3-liter, 4-necked flask equipped with a motor driven stainless steel stir blade, a water-cooled condenser, a nitrogen sparge, and a heating mantle with a thermometer connected through a temperature feedback control device. The contents of flask were heated to 160° C. and held at that temperature until the isocyanate equivalent weight (NCO EQ Wt) measured >2600 eq/g by titration. The temperature was then decreased to 90° C. and NCO Eq Wt was measured again 2960. At 90° C., charge 2 was added into reaction mixture, then charge 3 was added over 20 minutes. The mixture was held at 90-100° C. until IR spectroscopy showed the absence of the characteristic NCO band. Water dispersible carbodiimide resin was obtained.

To another 5 L flask, charge 5 was added and the mixture was preheated to 80° C. Then, charge 4 (water dispersible carbodiimide) was added into 2 L flask and the mixture was maintained by stirring over 20 minutes. The formed waterborne resin was cooled to 40° C. and poured out.

Example 5

Carbodiimide Resin E Formation

In this example, a carbodiimide resin is formed, referred to below as Carbodiimide E. Carbodiimide E is used in later examples to test corrosion resistance on substrates in Example R. The components used to form Carbodiimide E are shown below in Table 5. Carbodiimide E has siloxane functionality, and carbodiimide D does not.

TABLE 5

Carbodiimide E Composition

| Ingredients | Parts by weight |
|---|---|
| Charge #1 | |
| Desmodur W[1] | 1180.5 |
| M-TMI[2] | 301.9 |
| PROGLYDE ™ DMM[3] | 75.5 |
| Phospholene oxide[4] | 7.4 |
| Charge #2 | |
| Dibutyltin dilaurate[5] | 0.13 |
| Charge #3 | |
| Carbowax MPEG 550 [6] | 180.6 |
| Silquest A-1110[7] | 19.6 |
| PROGLYDE ™ DMM | 17.3 |
| Charge #4 | |
| Above resin | 1461.5 |
| Charge #5 | |
| Deionized water | 4384.6 |
| Sodium dodecylbenzenesulfonate | 102.3 |

[1] Desmodur W is methylene-bis-(4-cyclohexyldiisocyanate) from Bayer Material Science, LLC
[2] M-TMI is 3-Isopropenyl-α,α-dimethylbenzyl isocyanate from Allnex.
[3] PROGLYDE ™ DMM is dipropylene glycol dimethyl ether is commercially available from Dow Chemical.
[4] Phospholene oxide is 1-methyl-1-oxo-phospholene from Clariant Chemical
[5] Dibutyltin dilaurate is commercially available from Air Products & Chemicals
[6] Carbowax 550 is methoxy polyethylene glycol, 550 MW from Dow chemical Co.
[7] Silquest A-1110 is commercially available from Momentive Performance Materials.
[8] Sodium dodecylbenzenesulfonate is surfactant and commercially available from Sigma Aldrich.

Charge 1 was added to a 2-liter, 4-necked flask equipped with a motor driven stainless steel stir blade, a water-cooled condenser, a nitrogen sparge, and a heating mantle with a thermometer connected through a temperature feedback control device. The contents of flask were heated to 160° C. and held at that temperature until the isocyanate equivalent weight (NCO EQ Wt) measured >2600 eq/g by titration. The temperature was then decreased to 100° C. and NCO Eq Wt was measured again 2957. At 100° C., charge 2 was added into reaction mixture, then Charge 3 was added over 20 minutes. The mixture was held at 90-100° C. until IR spectroscopy showed the absence of the characteristic NCO band. Water dispersible carbodiimide resin was obtained.

To another 1 L flask, charge 5 was added and the mixture was preheated to 80° C. Then, charge 4 (water dispersible carbodiimide resin) was added into 1 L flask and the mixture was maintained by stirring over 20 minutes. The formed waterborne resin was cooled to 40° C. and poured out.

Example 6

Corrosion and Edge Test for Examples C-E

In this example, Carbodiimides A and B are combined with a siloxane (in the form of Hydrosil 2627) to form a surface coating on a substrate, which was then treated with a powder coating. The coated substrate was then tested for corrosion resistance and edge coverage.

Examples C-E were prepared by adding the listed ingredients from Table 6 in the order listed to the water component under mild mixing conditions. Standard B1000 NO DIW unpolished item #13118 for salt spray testing, was then dipped into the example solutions under mild mixing conditions for 5 seconds, hung, and dried for 3 minutes at 110° C. to dry and cool before the powder coating below was applied. Example X is an untreated panel with powder coating applied as a control. To test for edge coverage HRS coupons with significant amount of sharp edges were dipped into the example solutions for 5 seconds, hung, and dried for 3 minutes at cool before the powder coating below was applied.

TABLE 6

Coating Composition of Examples C-E

| | Example X | Example C (2%) | Example D | Example E |
|---|---|---|---|---|
| SZR-10 [4] | — | 938.94 | 928.94 | 912.04 |
| AW-98-9674 [1] | — | 12.51 | 12.51 | 12.51 |
| AWB-1883 [2] | — | 0.66 | 0.66 | 0.66 |
| Carbodiimide -A [3] | — | 47.89 | 47.89 | — |
| Carbodiimide -B [5] | — | — | — | 74.79 |
| Hydrosil 2627 [7] | — | — | 10.0 | — |
| Total | — | 1000.0 | 1000.0 | 1000.0 |

[1] Hydromax 300 commercially available from Alfa Chemicals
[2] A nonionic surfactant commercially available from DOW
[3] Carbodiimide A composition at 41.8% solids.
[4] De-ionized water
[5] Carbodiimide B composition with silane-functionality at 26.7% solids.
[7] Hydrosil 2627 available from Evonik Industries The powder coatings PCT491185, a TGIC cured powder coating, and PCST791135, a primid cured powder coating, are commercially available powders from PPG Industries, Inc., and were applied with an Encore Nordson powder coating cup gun at 75 kV, 10 mA, 10 psi atomizing and 10 psi conveying flow air. The coating thickness was between 64 um to 100 um. The coatings were cured 375° F. for 20 minutes to form a coating layer. Comparative corrosion was done, as per ASTM B117 for 500 hours, with a scribe to the metal substrate down the middle of the test panels. After testing the panels were scraped free of lose coating and corrosion products under a warm water flow. The exposed metal and corrosion product scribe creep was measured as total scribe creep across the exposed area 90° to the scribe line. An average of 6 readings on three panels is reported in millimeters total scribe creep is reported in Table 7 below.

TABLE 7

B117 Scribe Corrosion after 500 hours (mm total scribe creep)

| | Example X | Example C (2%) | Example D | Example E |
|---|---|---|---|---|
| PCT49118 | 9 | 15 | 3 | 9 |

Example 7

Corrosion Test for Examples F-J

In this example, a carbodiimide, in this case Carbodilite, is combined with varying siloxanes (Hydrosil 2776 or Hydrosil 2627) to form a surface coating on a substrate. The surface coating is then treated with a powder coating and tested for corrosion resistance. Hydrosil 2776 comprises a secondary amine, as well as a primary amine on the siloxane structure, whereas Hydrosil 2627 only comprises primary amines.

Examples F-J were prepared by adding the listed ingredients in the order listed in Table 9 to the water component under mild mixing conditions. Standard B1000 NO DIW unpolished item #13118 for salt spray testing or ACT (#13118) for cyclic corrosion testing, was then dipped into the example solutions under mild mixing conditions for 5 seconds, hung, and dried for 3 minutes at 110° C. to dry and cool before the powder coating below was applied. Example X is an untreated panel with powder coating applied as a control.

TABLE 9

Coating Compositions of Examples F-J

| | Example X | Example F (2%) | Example G | Example H | Example I | Example J |
|---|---|---|---|---|---|---|
| SZR-10 [4] | — | 936.83 | 926.83 | 926.83 | 921.83 | 921.83 |
| AW-98-9674 [1] | — | 12.51 | 12.51 | 12.51 | 12.51 | 12.51 |
| AWB-1883 [2] | — | 0.66 | 0.66 | 0.66 | 0.66 | 0.66 |
| HR-77-9480 [3] | — | 50.0 | 50.0 | 50.0 | 50.0 | 50.0 |
| Hydrosil 2776 [8] | — | — | 10.0 | — | 15.0 | — |
| Hydrosil 2627 [7] | — | — | — | 10.0 | — | 15.0 |
| Total | — | 1000.0 | 1000.0 | 1000.0 | 1000.0 | 1000.0 |

[1] Hydromax 300 commercially available from Alfa Chemicals
[2] A nonionic surfactant commercially available from DOW
[3] Carbodilite E0-5 from Nisshinbo Chemical Inc.
[4] De-ionized water
[7] hydrosil 2627 available from Evonik Industries
[8] hydrosil 2776 available from Evonik Industries The powder coatings PCT491185 a TGIC cured powder coating, PCST791135 and PCST991045 primid cured powder coatings commercially available powder from PPG were applied with an Encore Nordson powder coating cup gun at 75 kV, 10 mA, 10 psi atomizing and 10 psi conveying flow air. The coating thickness was between 64 um to 100 um. The coatings were cured 375° F. for 20 minutes to form a coating layer. Comparative corrosion was done, as per ASTM B117 for 1000 hours or SAE J2334 cyclic corrosion for 40 cycles, with a scribe to the metal substrate down the middle of the test panels. After testing the panels were scraped free of lose coating and corrosion products under a warm water flow. The exposed metal and corrosion product scribe creep was measured as total scribe creep across the exposed area 90° to the scribe line. An average of 10 readings on two panels is reported in millimeters total scribe creep is reported in Tables 10 and 11 below.

TABLE 10

ASTM B117 Testing for Examples F-J (mm of Total Scribe Creep)

| | Example X | Example F (2%) | Example G | Example H | Example I | Example J |
|---|---|---|---|---|---|---|
| PCT49118 | 5 | 5 | 2 | 2 | 2 | 1 |
| PCST79113 | 14 | 7 | 15 | 5 | — | — |
| PCST99104 | 18 | 7 | 16 | 3 | — | — |

TABLE 11

SAE J2334 Testing for Examples F-J (mm of Total Scribe Creep)

| | Example X | Example F (2%) | Example G | Example H | Example I | Example J |
|---|---|---|---|---|---|---|
| PCT49118 | 3.9 | 4.2 | 3.5 | 2.8 | — | — |

Example 8

Corrosion Testing for examples K-L

In this example, a carbodiimide is combined with a siloxane (in this example, Hydrosil 2627) to form a surface coating on a substrate. Multiple different powder coating compositions were created to be applied to the substrates and were then applied to form cured substrates. The cured substrates were then tested for corrosion resistance.

Surface treatment examples K-L were prepared by adding the listed ingredients in the order listed in Table 12 to the water component under mild mixing conditions. Standard B1000 NO DIW unpolished item #13118 was then dipped into the example solutions under mild mixing conditions for 5 seconds, hung, and dried for 3 minutes at 110° C. to dry and cool before the powder coating below was applied. Example X is an untreated panel with powder coating applied as a control.

TABLE 12

Compositions for Examples K-L

| | Example X | Example K (2%) | Example L |
|---|---|---|---|
| SZR-10 [4] | | 971.83 | 949.77 |
| AW-98-9674 [1] | — | 12.51 | 12.51 |
| AWB-1883 [2] | — | 0.66 | 0.66 |
| Carbodiimide C [6] | — | — | 22.06 |
| Hydrosil 2627 [7] | — | 15.00 | 15.00 |
| Total | — | 1000.0 | 1000.0 |

[1] Hydromax 300 commercially available from Alfa Chemicals
[2] A nonionic surfactant commercially available from DOW
[4] De-ionized water
[6] Carbodiimide C from Example 3
[7] Hydrosil 2627 available from Evonik Industries The overcoat in Examples M-O below were prepared as follows. Each of the components listed in Table 13 below were weighed in a container (measurements in Table 11 are in grams) and mixed in a prism high speed mixer for 30 seconds at 3500 RPM to form a dry homogeneous mixture. The mixture was then melt-mixed in a Werner Pfleiderer 19 mm twin screw extruder with an aggressive screw configuration and a speed of 500 RPM. The first zone was set at 50° C., and the second, third, and fourth zones were set at 110° C. The feed rate was such that a torque of 55-65% was observed on the equipment. The mixtures were dropped onto a set of chill rolls to cool and re-solidify the mixtures into solid chips. The chips were weighed and 0.1% of Aerosil 200 was added before milling in a Mikro ACM®-1 Air Classifying Mill to obtain a particle size of 5 to 90 microns with a majority of the particles being from 20 to 50 microns and an average particle size of approximately 27-32 microns. The resulting overcoat for each of example were solid particulate powder coating compositions that were free flowing.

TABLE 13

Compositions for Examples M-O

| | Example M | Example N | Example O |
|---|---|---|---|
| rucote 9010 [9] | 68.48 | 65.69 | 66.62 |
| TGIC [10] | 5.15 | 4.94 | 5.01 |
| Vestagon BF 1540 [11] | 2.64 | 2.64 | 2.64 |
| Benzoin [12] | 0.48 | 0.48 | 0.48 |
| PL-200 [13] | 0.87 | 0.87 | 0.847 |

TABLE 13-continued

Compositions for Examples M-O

| | Example M | Example N | Example O |
|---|---|---|---|
| Anti-crater[14] | 0.25 | 0.25 | 0.25 |
| Songnox CS 1076CP[19] | 0.24 | 0.24 | 0.24 |
| Micromide 520L[20] | 0.48 | 0.48 | 0.48 |
| TiO2 [15] | 4.90 | 4.90 | 4.90 |
| Yellow Iron Oxide [16] | 16.20 | 16.20 | 16.20 |
| Chartsil C-523.2H | — | 3.0 | 2.0 |
| Aerosil 200 [17] | 0.15 | 0.15 | 0.15 |
| Total | 100 | 100 | 100 |

[9] Acid functional polyester commercially available from Stepan Company
[10] TGIC commercially available from Huntsman
[11] Vestagon BF 1540 commercially available from Evonik
[12] Benzoin, commercially available from Mitsubishi Chemical Corp
[13] Acrylic/silica flow and leveling control agent, commercially available from Estron Chemical
[14] Imide hydroxyl urethane additive produced internally by PPG Industries
[15] Tiona 696 commercially available from Cristal Global
[16] Synthetic yellow iron oxide commercially available from Huntsman
[17] Aerosil 200 commercially available from Evonik Degussa
[18] Chartsil C-523.2H commercially available from Chartwell International
[19] Antioxidant available from Songwon
[20] Wax commercially available from Micro Powders TGIC cured powder coating compositions prepared above in examples M-O were applied with an Encore Nordson powder coating cup gun at 75 kV, 10 mA, 10 psi atomizing and 10 psi conveying flow air. The coating thickness was between 64 um to 100 um. The coatings were cured 375° F. for 20 minutes to form a coating layer. Comparative corrosion examples were done, as per ASTM B117 for 750 hours with a scribe to the metal substrate down the middle of the test panels. After testing the panels were scraped free of lose coating and corrosion products under a warm water flow. The exposed metal and corrosion product scribe creep was measured as total scribe creep across the exposed area 90° to the scribe line. An average of 10 readings on two panels was reported in millimeters total scribe creep is reported in Table 14 below.

TABLE 14

ASTM B117 Testing for Examples K-L and M-O (mm Total Scribe Creep)

| | Example X | Example K | Example L |
|---|---|---|---|
| Example M | 10 | 4 | 2 |
| Example N | 9 | 4 | 1 |
| Example O | 11 | 3 | 1 |

Example 9

Edge Coverage for Example P

Figure 3:
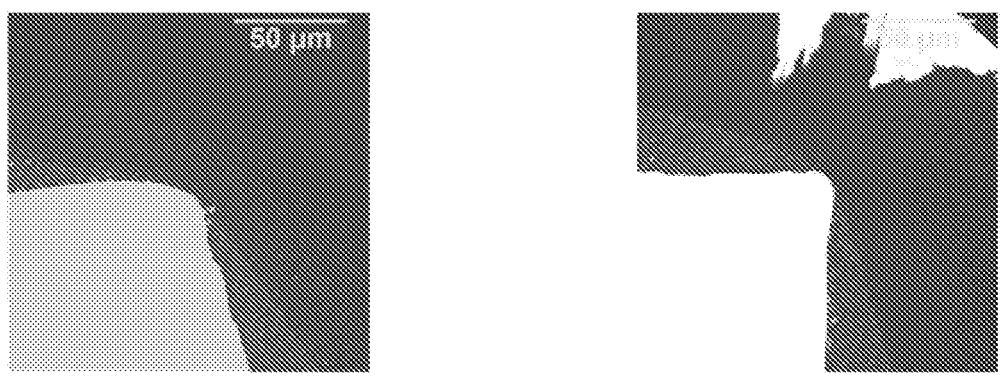
FIGS. 3 and 4 are SEM photographs of coated substrates in accordance with Example 6 below.
Figure 4:
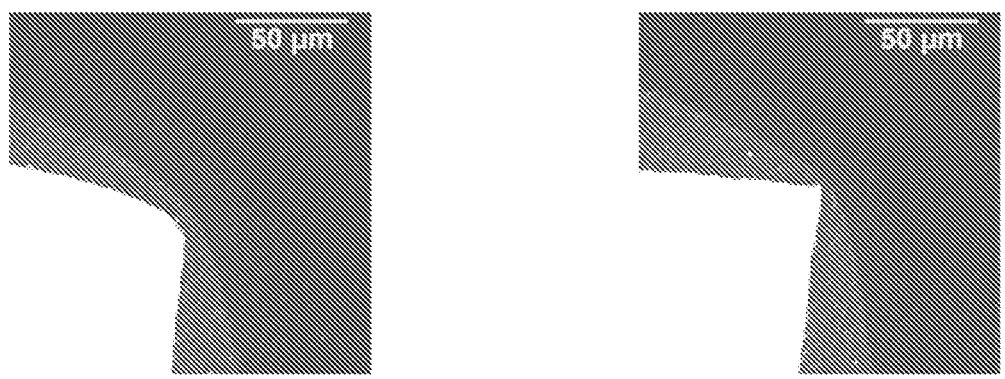

In this example, a carbodiimide is combined with a siloxane (in this example, Hydrosil 2627) to form a surface coating on a substrate, which was compared to a substrate without a surface coating. A powder coating composition was applied to the substrates which were then cured to form a coating layer. The cured substrates were then tested for film build on the edges of the substrate through scanning electron microscope (SEM) analysis (FIGS. 3 and 4).

Examples were prepared by adding the listed ingredients in the order listed in Table 15 to the water component under mild mixing conditions. Laser cut HRS test pieces with significant amount of sharp edges for cross-sectional microscopy, where initial pretreated with an iron phosphate cleaner-coater. The parts where then dipped into the example solutions under mild mixing conditions for 5 seconds, hung, and dried for 3 minutes at 110° C. to dry and cool before the powder coating below was applied. Example X is an untreated panel with powder coating applied as a control.

TABLE 15

Composition for Example P

| | Example X | Example P |
|---|---|---|
| SZR-10 [3] | — | 936.83 |
| AW-98-9674 [1] | — | 12.51 |
| AWB-1883 [2] | — | 0.66 |
| Commercial Carbodiimide [4] | — | 50.00 |
| Hydrosil 2627 [5] | — | |
| Total | — | 1000.0 |

[1] Hydromax 300 commercially available from Alfa Chemicals
[2] A nonionic surfactant commercially available from DOW
[3] De-ionized water
[4] Carbodilite E-05 commercially available from GSI Exim America, Inc.
[5] Hydrosil 2627 available from Evonik Industries The powder coatings PCT491185 (a commercially available coating available from PPG), a TGIC cured powder coating was applied with an Encore Nordson powder coating cup gun at 75 kV, 10 mA, 10 psi atomizing and 10 psi conveying flow air. The coating thickness was between 64 um to 100 um. The coatings were cured 375° F. for 20 minutes to form a coating layer. The coated coupons were supplied to SEM cross-sectional analysis. The panels were cut with a panel cutter and placed in epoxy overnight. Once cured, the epoxy mounts were ground and polished then placed on an aluminum stub with carbon tape. After being coated with Au for 20 seconds, Samples were then analyzed in the Aspex SEM under high vacuum. The accelerating voltage was set to 20.00 kV. For each cut piece, the SEM analysis measured the film build covering the sharp edge of the metal part, with each cut having two sharp edges. The SEM image for the blank Example X is shown in FIG. 3, and the SEM image for Example P is shown in FIG. 4. The results are summarized in Table 16 below.

TABLE 16

Film Buildup on Edge (μm)

| | Example X | Example P |
|---|---|---|
| Edge 1 | 3.52 ± 0.224 | 4.13 ± 0.517 |
| Edge 2 | 4.86 ± 0.571 | 9.52 ± 0.486 |
| Average | 4.19 | 6.83 |

Example 10

Edge Corrosion for Examples Q and R

In this example, a carbodiimide is combined with a siloxane (in this example, Hydrosil 2627) to form a surface coating on a substrate (Example Q), and another surface coating was made with a carbodiimide having siloxane functionality, and with dimethyl ethanol amine instead of the additional siloxane (Example R). Both substrates with a surface coating were compared to a substrate without a surface coating. A powder coating composition was applied to the substrates which were then cured to form a coating layer. The cured substrates were then tested for edge corrosion per SAE J2334 ATSM.

Examples were prepared by adding the listed ingredients from Table 17 below in a concentrate form under mild mixing conditions. In a tank within a small-scale pretreatment line, water was added to create a 10% solution of the examples below. Laser cut HRS test pieces, with significant amount of sharp edges for cross-sectional microscopy, where pretreated on the 5 stage small scale spray line moving through a cleaner, rinse, iron phosphate, and rinse before the example samples were applied via spray application. The parts where then removed from the line and placed into an oven at 120° C. to dry and cool before the powder coating below was applied. Example X is an untreated panel with powder coating applied as a control.

TABLE 17

Compositions for Examples Q and R

| | Example X | Example Q | Example R |
|---|---|---|---|
| AW-98-9674 [1] | — | 1343.52 | 1343.52 |
| SZR-10 [3] | — | 1343.52 | 1343.52 |
| AWB-1883 [2] | — | 75.24 | 75.24 |
| Hydrosil 2627 [5] | — | 300.00 | — |
| DMEA [11] | — | — | 2.86 |
| BYK-024 [6] | — | 30.03 | 30.03 |
| BYK-348 [7] | — | 30.03 | 30.03 |
| Carbodiimide D [8] | — | 3224.4 | — |
| Carbodiimide E [9] | — | — | 5091.0 |
| FHZ-7265 [10] | — | 18.3 | 18.3 |
| Total | — | 6365.0 | 7934.5 |

[1] Hydromax 300 commercially available from Alfa Chemicals
[2] A nonionic surfactant commercially available from DOW
[3] De-ionized water
[5] Hydrosil 2627 available from Evonik Industries
[6] BYK-024 commercially available BYK
[7] BYK-348 commercially available BYK
[8] Carbodiimide resin D as prepared in Example 4 above
[9] Carbodiimide resin E as prepared in Example 5 above.
[10] Triethyl phosphate
[11] Dimethyl ethanol amine The powder coatings PCTZ39104 a TGIC cured powder coating was applied with an Encore Nordson powder coating cup gun at 75 kV, 10 mA, 10 psi atomizing and 10 psi conveying flow air. The coating thickness was between 64 um to 100 um. The coatings were cured 375° F. for 20 minutes to form a coating layer. Comparative corrosion was done, as per SAE J2334 ASTM for 40 hours, taping the top part of the substrate which was in contact with rack during the spraying and curing process. After testing the amount of the sharp edge which displayed corrosion was measured, the compared to the total edges of the coupon to provide a percent of the total edge which has corroded. The edges of each coupon were segmented into 1×1 cm squares. The number of 1×1 squares that contained corrosion were counted, and then divided by the total amount of 1×1 squares along the edges of the substrate to determine the percent of the substrate that demonstrated edge corrosion. For each example three coupons were tested. The results are summarized in Table 18 below. Note that Example R was prepared with Carbodiimide E, which contained siloxane functionality, whereas Example Q was prepared with Carbodiimide D, which did not have siloxane functionality itself, but was combined with Hydrosil 2627 (a siloxane) in the surface coating.

TABLE 18

Percent of Examples Q and R with Edge Corrosion (%)

| | Example X | Example Q | Example R |
|---|---|---|---|
| Coupon 1 | 100 | 2 | 24 |
| Coupon 2 | 100 | 16 | 21 |
| Coupon 3 | 100 | 4 | 23 |
| Average | 100 | 7 | 23 |

ASPECTS

Aspect 1 is a method for improving adhesion of a coating to a substrate and/or for improving edge coverage and corrosion resistance of a coating on a substrate, comprising contacting at least a portion of the substrate with a surface coating comprising a multi-unit carbodiimide of the formula:

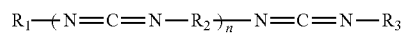

wherein:
  $R_1$ and $R_3$ each independently comprise a group selected from alkyl, arylalkyl, cycloalkyl, ether, polyether, siloxane, urethane, urea, imine, amide, carbodiimide, isocyanate, carbonyl, and carbamate;
  $R_2$ comprises a group selected from alkyl, arylalkyl, and cycloalkyl; and
  n is at least 2;
applying, to the surface coating, an overcoat comprising a group reactive with the surface coating; and
curing overcoat to form a coating layer.

Aspect 2 is the method of Aspect 1, wherein $R_2$ comprises a dicyclohexylmethane group of the following formula:

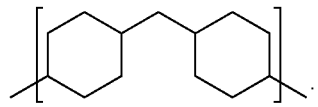

Aspect 3 is the method of Aspect 1 or Aspect 2, wherein at least one of $R_1$ and $R_3$ comprises a siloxane group of the following formula:

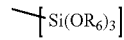

wherein $R_6$ comprises a group selected from hydrogen, methyl, ethyl, and isopropyl.

Aspect 4 is the method of any of Aspects 1-3, wherein the contacting step further comprises contacting at least a portion of the substrate with a surface coating comprising a compound of the formula:

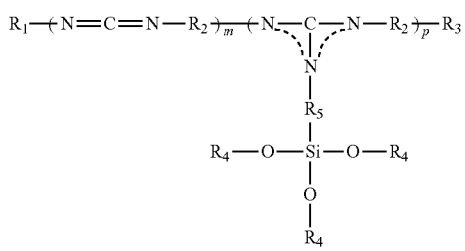

wherein:
$R_1$ and $R_3$ each independently comprise a group selected from alkyl, arylalkyl, cycloalkyl, ether, polyether, siloxane, urethane, urea, imine, amide, carbodiimide, isocyanate, carbonyl, and carbamate;
$R_2$ comprises a group selected from alkyl, arylalkyl, and cycloalkyl;
$R_4$ comprises a group selected from hydrogen, alkyl, arylalkyl, cycloalkyl, amine, and siloxane;
$R_5$ comprises a comprises a group selected from alkyl, arylalkyl, cycloalkyl, amine, and amide;
m+p is at least 2; and
the dashed lines represent tautomerization wherein any one of the carbon-nitrogen bonds is a double bond.

Aspect 5 is the method of any of Aspects 1-4, wherein the surface coating is formulated in an aqueous solution.

Aspect 6 is the method of any of Aspects 1-5, wherein the contacting step further comprises binding the surface coating to at least a portion of the substrate by reacting the surface coating with at least one hydroxyl group on the substrate.

Aspect 7 is a coated substrate comprising:
a substrate; and
a coating applied to the substrate, the coating comprising:
a surface coating applied to at least a portion of the substrate, the surface coating comprising a multi-unit carbodiimide having the formula:

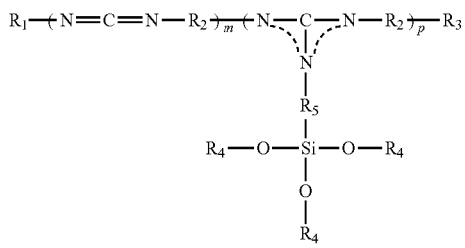

wherein:
$R_1$ and $R_3$ independently comprise a group selected from alkyl, arylalkyl, cycloalkyl, ether, polyether, siloxane, urethane, urea, imine, amide, carbodiimide, isocyanate, carbonyl, and carbamate;
$R_2$ comprises a group selected from alkyl, arylalkyl, and cycloalkyl;
$R_4$ comprises a group selected from alkyl, arylalkyl, cycloalkyl, amine, and siloxane;
$R_5$ comprises a comprises a group selected from alkyl, arylalkyl, cycloalkyl, amine, and amide;
m+p is at least 2; and
the dashed lines represent tautomerization wherein any one of the carbon-nitrogen bonds is a double bond; and
an overcoat layer disposed on the surface coating and chemically bonded to the surface coating through an acid functionalized or hydroxyl group of the overcoat layer.

Aspect 8 is the coated substrate of Aspect 7, wherein the coating has a thickness from 20 µm to 250 µm.

Aspect 9 is the coated substrate of Aspect 7 or Aspect 8, wherein the surface coating is chemically bonded to at least a portion of the substrate through at least one hydroxyl group on the substrate.

Aspect 10 is the substrate of any of Aspects 7-9, wherein the acid functionalized or hydroxyl group reacts with the multi-unit carbodiimide to chemically bond the overcoat layer to the surface coating.

Aspect 11 is the substrate of any of Aspects 7-10, wherein the coating exhibits a total scribe creep of less than 4 mm after corrosion testing for 750 hours in accordance with ATSM B117.

Aspect 12 is the substrate of any of Aspects 7-11, wherein at least one of $R_1$ and $R_3$ comprise a group selected from a polyether, a methylstyrene, and a siloxane, and $R_2$ comprises a dicyclohexylmethane group.

Aspect 13 is a compound comprising a multi-unit carbodiimide of the following formula:

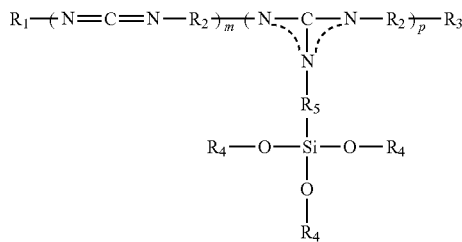

wherein:
$R_1$ and $R_3$ independently comprise a group selected from alkyl, arylalkyl, cycloalkyl, ether, polyether, siloxane, urethane, urea, imine, amide, carbodiimide, isocyanate, carbonyl, and carbamate;
$R_2$ comprises a group selected from alkyl, arylalkyl, and cycloalkyl;
$R_4$ comprises a group selected from alkyl, arylalkyl, cycloalkyl, amine, and siloxane;
$R_5$ comprises a group selected from alkyl, arylalkyl, cycloalkyl, amine, and amide;
m+p is at least 2; and
the dashed lines represent tautomerization wherein any one of the carbon-nitrogen bonds is a double bond.

Aspect 14 is the compound of Aspect 13, wherein at least one of $R_1$ and $R_3$ comprise a group selected from a polyether, a methylstyrene, and a siloxane, and $R_2$ comprises a dicyclohexylmethane group.

Aspect 15 is the compound of Aspect 14, wherein at least one of $R_1$ and $R_3$ comprise a group selected from:
a polyether group of the formula:

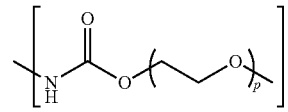

wherein p is at least 6;
a methylstyrene group of the formula:

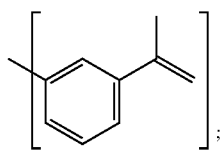

and
a siloxane group of the formula:

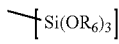

wherein $R_6$ comprises a group selected from hydrogen, methyl, ethyl, and isopropyl.

Aspect 16 is the compound of any of Aspects 13-15, wherein $R_5$ comprises at least one secondary amine group.

Aspect 17 is the compound of any of Aspects 13-16, wherein $R_4$ comprises at least one amine group.

Aspect 18 is a method of making a siloxane-modified multi-unit carbodiimide compound comprising:

reacting a carbodiimide with a siloxane, the carbodiimide having the following formula:

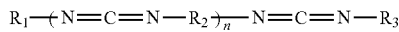

wherein:

$R_1$ and $R_3$ independently comprise a group selected from alkyl, arylalkyl, cycloalkyl, ether, polyether, siloxane, urethane, urea, imine, amide, carbodiimide, isocyanate, carbonyl, and carbamate;

$R_2$ comprises a group selected from alkyl, arylalkyl, and cycloalkyl; and n is at least 2; and the siloxane having the following formula:

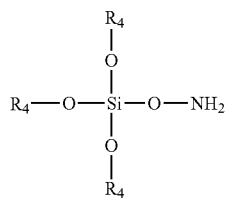

wherein:

$R_4$ comprises a group selected from alkyl, arylalkyl, cycloalkyl, amine, and siloxane; and $R_5$ comprises a group selected from alkyl, arylalkyl, cycloalkyl, amine, and amide; and wherein the reacting step forms a siloxane-modified multi-unit carbodiimide compound of the following formula:

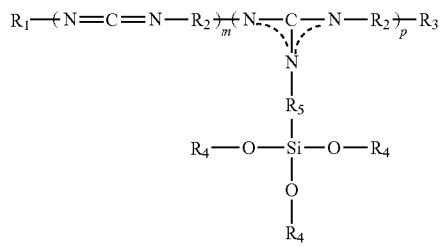

wherein m+p is at least 2 and the dashed lines represent tautomerization wherein any one of the carbon-nitrogen bonds is a double bond.

Aspect 19 is the method of Aspect 18, wherein at least one of $R_1$ and $R_3$ comprise a group selected from:

a polyether group of the formula:

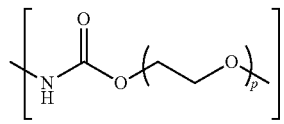

wherein p is at least 6;

a methylstyrene group of the formula:

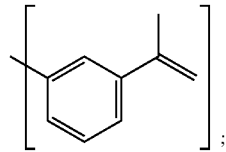

and
a siloxane group of the formula:

wherein $R_6$ comprises a group selected from hydrogen, methyl, ethyl, and isopropyl.

Aspect 20 is the method of Aspect 18 or Aspect 19, wherein $R_2$ comprises a dicyclohexylmethane group of the formula:

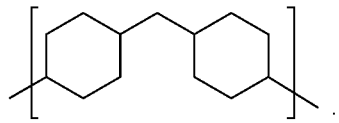

Aspect 21 is a coated substrate, coating by the method of any of Aspects 1-6.

Aspect 22 is a coated substrate, having a coating comprising the compound of any of Aspects 13-17.

Aspect 23 is a coated substrate, having a coating comprising the compound made is accordance with the method of any of Aspects 18-20.

Whereas particular examples of this invention have been described above for purposes of illustration, it will be evident to those skilled in the art that numerous variations of

What is claimed is:

1. A method for improving adhesion of a coating to a substrate and/or for improving edge coverage and corrosion resistance of a coating on a substrate, comprising:
    contacting at least a portion of the substrate with a surface coating comprising:
    (i) a multi-unit carbodiimide of the formula (I):

$$R_1 \!-\!\!\left(\!N\!=\!C\!=\!N\!-\!R_2\!\right)_{\!n}\!\!-\!N\!=\!C\!=\!N\!-\!R_3$$

wherein
        n is at least 2; and
    (ii) a siloxane of the formula (II):

$$R_4\!-\!O\!-\!\underset{\underset{R_4}{\overset{\overset{R_4}{|}}{\overset{|}{O}}}{\overset{|}{Si}}}\!-\!O\!-\!NH_2;$$

or
    (iii) a compound formed from the reaction of the compound of formula (I) with the compound of formula (II) having the formula (III):

$$R_1\!-\!\!\left(\!N\!=\!C\!=\!N\!-\!R_2\!\right)_{\!m}\!\!\left(\!N\!-\!\overset{\cdot\cdot}{\underset{\cdot\cdot}{C}}\!-\!N\!-\!R_2\!\right)_{\!p}\!\!-\!R_3$$
    $$\underset{\underset{R_4}{\overset{\overset{R_5}{|}}{\overset{|}{N}}}}{\overset{|}{|}}$$
    $$R_4\!-\!O\!-\!\underset{\underset{R_4}{|}}{\overset{|}{Si}}\!-\!O\!-\!R_4$$

wherein:
        $R_1$ and $R_3$ each independently comprise a group selected from alkyl, arylalkyl, cycloalkyl, ether, polyether, siloxane, urethane, urea, imine, amide, carbodiimide, isocyanate, carbonyl, and carbamate;
        $R_2$ comprises a group selected from alkyl, arylalkyl, and cycloalkyl;
        $R_4$ comprises a group selected from hydrogen, alkyl, arylalkyl, cycloalkyl, amine, and siloxane, wherein $R_4$ comprises at least one amine group;
        $R_5$ comprises a comprises a group selected from alkyl, arylalkyl, cycloalkyl, amine, and amide;
        m+p is at least 2; and
        the dashed lines represent tautomerization wherein any one of the carbon-nitrogen bonds is a double bond;
    applying, to the surface coating, an overcoat comprising a group reactive with the surface coating; and
    curing overcoat to form a coating layer.

2. The method of claim 1, wherein $R_2$ comprises a dicyclohexylmethane group of the following formula:

$$\left[\!\!\!\begin{array}{c}\text{(dicyclohexylmethane structure)}\end{array}\!\!\!\right].$$

3. The method of claim 1, wherein at least one of $R_1$ and $R_3$ comprises a siloxane group of the following formula:

$$\left[\!\!\!\begin{array}{c}\text{\textbackslash}Si(OR_6)_3\end{array}\!\!\!\right]$$

wherein $R_6$ comprises a group selected from hydrogen, methyl, ethyl, and isopropyl.

4. The method of claim 1, wherein the surface coating is formulated in an aqueous solution.

5. The method of claim 1, wherein the contacting step further comprises binding the surface coating to at least a portion of the substrate by reacting the surface coating with at least one hydroxyl group on the substrate.

6. The method of claim 1, wherein at least one of $R_1$ and $R_3$ comprise a group selected from a polyether, a methylstyrene, and a siloxane, and $R_2$ comprises a dicyclohexylmethane group.

7. The method of claim 1, wherein at least one of $R_1$ and $R_3$ comprise a group selected from:
    a polyether group of the formula:

$$\left[\!\!\!\begin{array}{c}\underset{H}{N}\!-\!\overset{\overset{O}{\|}}{C}\!-\!O\!\!\left(\!\!\phantom{X}\!\!\right)\!\!O\!\right]_{\!p}$$

wherein p is at least 6;
    a methylstyrene group of the formula:

$$\left[\!\!\!\begin{array}{c}\text{(methylstyrene structure)}\end{array}\!\!\!\right];$$

and
    a siloxane group of the formula:

$$\left[\!\!\!\begin{array}{c}\text{\textbackslash}Si(OR_6)_3\end{array}\!\!\!\right]$$

wherein $R_6$ comprises a group selected from hydrogen, methyl, ethyl, and isopropyl.

8. The method of claim 1, wherein the siloxane of formula (II) is part of a polysiloxane structure comprising at least two silicon atoms covalently bonded through an oxygen atom.

9. A coated substrate comprising:
    a substrate; and
    a coating applied to the substrate, the coating comprising:
        a surface coating applied to at least a portion of the substrate, the surface coating comprising a multi-unit carbodiimide bonded to a siloxane and having the formula:

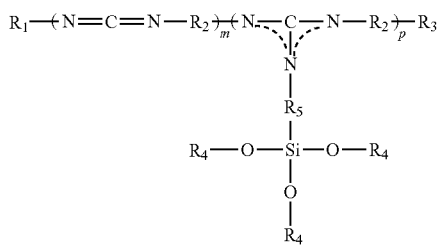

wherein:
R$_1$ and R$_3$ independently comprise a group selected from alkyl, arylalkyl, cycloalkyl, ether, polyether, siloxane, urethane, urea, imine, amide, carbodiimide, isocyanate, carbonyl, and carbamate;
R$_2$ comprises a group selected from alkyl, arylalkyl, and cycloalkyl;
R$_4$ comprises a group selected from alkyl, arylalkyl, cycloalkyl, amine, and siloxane, wherein R$_4$ comprises at least one amine group;
R$_5$ comprises a comprises a group selected from alkyl, arylalkyl, cycloalkyl, amine, and amide;
m+p is at least 2; and
the dashed lines represent tautomerization wherein any one of the carbon-nitrogen bonds is a double bond; and
an overcoat layer disposed on the surface coating and chemically bonded to the surface coating through an acid functionalized or hydroxyl group of the overcoat layer.

10. The coated substrate of claim 9, wherein the coating has a thickness from 20 μm to 250 μm.

11. The coated substrate of claim 9, wherein the surface coating is chemically bonded to at least a portion of the substrate through at least one hydroxyl group on the substrate.

12. The substrate of claim 9, wherein the acid functionalized or hydroxyl group reacts with the multi-unit carbodiimide to chemically bond the overcoat layer to the surface coating.

13. The substrate of claim 9, wherein the coating exhibits a total scribe creep of less than 4 mm after corrosion testing for 750 hours in accordance with ATSM B117.

14. The substrate of claim 9, wherein at least one of R$_1$ and R$_3$ comprise a group selected from a polyether, a methylstyrene, and a siloxane, and R$_2$ comprises a dicyclohexylmethane group.

15. The coated substrate of claim 9, wherein the siloxane is part of a polysiloxane structure comprising at least two silicon atoms covalently bonded through an oxygen atom.

16. A compound comprising a multi-unit carbodiimide bonded to a siloxane of the following formula:

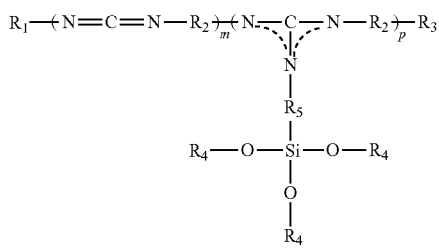

wherein:
R$_1$ and R$_3$ independently comprise a group selected from alkyl, arylalkyl, cycloalkyl, ether, polyether, siloxane, urethane, urea, imine, amide, carbodiimide, isocyanate, carbonyl, and carbamate;
R$_2$ comprises a group selected from alkyl, arylalkyl, and cycloalkyl;
R$_4$ comprises a group selected from alkyl, arylalkyl, cycloalkyl, amine, and siloxane, wherein R$_4$ comprises at least one amine group;
R$_5$ comprises a group selected from alkyl, arylalkyl, cycloalkyl, amine, and amide;
m+p is at least 2; and
the dashed lines represent tautomerization wherein any one of the carbon-nitrogen bonds is a double bond.

17. The compound of claim 16, wherein at least one of R$_1$ and R$_3$ comprise a group selected from a polyether, a methylstyrene, and a siloxane, and R$_2$ comprises a dicyclohexylmethane group.

18. The compound of claim 17, wherein at least one of R$_1$ and R$_3$ comprise a group selected from:
a polyether group of the formula:

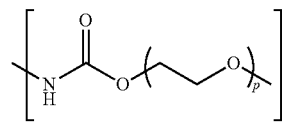

wherein p is at least 6;
a methylstyrene group of the formula:

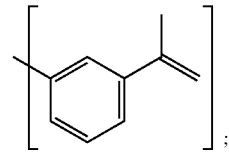

and
a siloxane group of the formula:

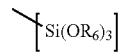

wherein R$_6$ comprises a group selected from hydrogen, methyl, ethyl, and isopropyl.

19. The compound of claim 16, wherein R$_5$ comprises at least one secondary amine group.

20. The compound of claim 16, wherein the siloxane is part of a polysiloxane structure comprising at least two silicon atoms covalently bonded through an oxygen atom.

* * * * *